United States Patent
Holzer et al.

(10) Patent No.: US 11,418,030 B2
(45) Date of Patent: Aug. 16, 2022

(54) FAST SIMULTANEOUS FEASIBILITY TESTING AND APPLICATIONS FOR ELECTRICAL POWER GRIDS

(71) Applicant: BATTELLE MEMORIAL INSTITUTE, Richland, WA (US)

(72) Inventors: Jesse T. Holzer, Kennewick, WA (US); Yonghong Chen, Zionsville, IN (US); Feng Pan, Sugar Land, TX (US); Edward Rothberg, Portland, OR (US)

(73) Assignee: BATTELLE MEMORIAL INSTITUTE, Richland, WA (US)

( * ) Notice: Subject to any disclaimer, the term of this patent is extended or adjusted under 35 U.S.C. 154(b) by 212 days.

(21) Appl. No.: 16/863,756

(22) Filed: Apr. 30, 2020

(65) Prior Publication Data

US 2020/0350762 A1    Nov. 5, 2020

Related U.S. Application Data

(60) Provisional application No. 62/842,661, filed on May 3, 2019.

(51) Int. Cl.
*H02J 3/00* (2006.01)
*G06Q 50/06* (2012.01)

(52) U.S. Cl.
CPC ............ *H02J 3/0012* (2020.01); *G06Q 50/06* (2013.01); *H02J 3/003* (2020.01); *H02J 2203/20* (2020.01)

(58) Field of Classification Search
CPC ...... H02J 3/0012; H02J 3/003; H02J 2203/20; H02J 3/004; G06Q 50/06; Y02E 40/70; Y02E 60/00; Y04S 10/50; Y04S 40/20
See application file for complete search history.

(56) References Cited

U.S. PATENT DOCUMENTS

| | | | |
|---|---|---|---|
| 7,058,115 B2 * | 6/2006 | Castelain | H04L 5/026 370/335 |
| 7,343,360 B1 * | 3/2008 | Ristanovic | G06Q 50/06 705/412 |

(Continued)

OTHER PUBLICATIONS

Alsac et al., "Sparsity-Oriented Compensation Methods for Modified Network Solutions", IEEE Transactions on Power Apparatus and Systems, vol. PAS-102, No. 5, pp. 1050-1060 (May 1983).

(Continued)

*Primary Examiner* — Thomas C Lee
*Assistant Examiner* — Anzuman Sharmin
(74) *Attorney, Agent, or Firm* — Klarquist Sparkman, LLP

(57) ABSTRACT

Fast simultaneous feasibility testing (SFT) for management of an electrical power grid is achieved through various innovations. The computation problem relates to evaluation of candidate solutions for external power flows into a power grid, with respect to predetermined constraints and contingencies. Storage and computations are reduced by formulating the problem in terms of transactional nodes (e.g. third party connections for generators and loads) instead of the larger number of bus nodes. Further advantages are achieved by precomputing matrices that can be reused across multiple SFT invocations, organizing matrices and operations to reduce storage and computation, and eliminating branches that have no contingency violations. The fast SFT further enables new applications for integrating SFT with a Security-Constrained Unit Commitment (SCUC) optimizer for efficient single pass solutions; operating SFT as a service to multiple SCUC solvers; or integration with Security-Constrained Economic Dispatch (SCED) optimization.

27 Claims, 10 Drawing Sheets

(56) References Cited

U.S. PATENT DOCUMENTS

| | | | |
|---|---|---|---|
| 9,552,007 B2* | 1/2017 | Ditlow | G06Q 50/06 |
| 2009/0063680 A1* | 3/2009 | Bridges | H02J 13/00002 |
| | | | 709/224 |
| 2013/0226482 A1* | 8/2013 | Sun | H02J 3/26 |
| | | | 702/60 |
| 2014/0039702 A1* | 2/2014 | Ilic | H02J 3/06 |
| | | | 700/286 |
| 2017/0229870 A1* | 8/2017 | Singh | H02J 3/382 |
| 2020/0091767 A1* | 3/2020 | Khodaei | G01R 19/0038 |

OTHER PUBLICATIONS

Chan et al., "Partial Matrix Refactorization", IEEE Transactions on Power Systems, vol. PWRS-1, No. 1, pp. 193-199 (Feb. 1986).

Holzer et al., "Fast evaluation of security constraints in a security constrained unit commitment algorithm", INFORMS Annual Meeting, Seattle, WA, pp. 1-15 (Oct. 2019).

Pan et al., "HIPPO—A Concurrent Optimizer for Solving Day-ahead Security Constrained Unit Commitment Problem", FERC Technical Conference, 28 pages, (Jun. 2019).

Shafi E-Khah et al., "Fast and accurate solution for the SCUC problem in large-scale power systems using adapted binary programming and enhanced dual neural network", Elsevier Ltd., pp. 1-24 (Sep. 2013).

Tesfatsion, "Power Trading Subject to Transmission Constraints", EE/Econ 458, Syllabus Section V.C, pp. 1-70 (Nov. 2011).

Wu et al., "Security-Constrained Unit Commitment Based on a Realizable Energy Delivery Formulation", Mathematical Problems in Engineering, vol. 2012, Article ID 178193, pp. 1-22 (Feb. 2012).

Zhai et al., "Fast Identification of Inactive Security Constraints in SCUC Problems", IEEE Transactions on Power Systems, vol. 25, No. 4, pp. 1946-1954 (Nov. 2010).

Zhu et al., "Flexible Simultaneous Feasibility Test in Energy Market", IEEE, 7 pages (Jul. 2010).

Zimmerman et al., "Matpower User's Manual Version 7.0", Power Systems Engineering Research Center, pp. 1-250 (Jun. 2019).

* cited by examiner

FAST SIMULTANEOUS FEASIBILITY TESTING AND APPLICATIONS FOR ELECTRICAL POWER GRIDS

CROSS REFERENCE TO RELATED APPLICATION

This application claims the benefit of U.S. Provisional Patent Application No. 62/842,661, entitled "FAST AND PARALLEL SOLVER FOR SIMULTANEOUS FEASIBILITY TEST," filed May 3, 2019, which application is incorporated herein by reference in entirety.

ACKNOWLEDGMENT OF GOVERNMENT SUPPORT

This invention was made with Government support under Contract DE-AC05-76RL01830 awarded by the U.S. Department of Energy. The Government has certain rights in the invention.

BACKGROUND

Simultaneous Feasibility Test (SFT) is an important tool for modern management of electric power grids. SFT is used to evaluate a proposed configuration of power injections into the grid, to verify that security constraints can be satisfied and that the proposed configuration can be safely implemented within the physical limitations of the power grid. However, because of the scale of modern power grids, with tens of thousands of nodes, and the sizes of data structures used, conventional technologies are computationally challenged to provide solutions in a practical amount of computation time. Accordingly, there is ample opportunity for improved technology for SFT.

SUMMARY

Methods and applications are disclosed for fast Simultaneous Feasibility Test (SFT) evaluation of candidate solutions of a Security-Constrained Unit Commitment (SCUC) problem for an electrical power grid. In some embodiments, innovative formulation of the computation required to address the underlying physical problem and/or innovative organization of the computation provide significantly more efficient computation of SFT as compared to conventional technology. Particularly, the number of computation operations, the amount of memory storage required, and the required computation time can all be significantly reduced. Innovations in formulation include setting up parts of the computation based on power injection at transactional nodes of a power grid rather than all nodes including infrastructure nodes. Innovations in organization include exemplary features, where suitable, of precomputing matrices, using sparse matrices, replacing operations on high-rank matrices with operations on matrices of lower rank, organizing matrix operations to reduce the number of multiplication operations required, consolidating two-dimensional arrays into three-dimensional arrays, or eliminating branches that can be shown to have no violations. In turn, the fast SFT computation enables innovations in deployment, allowing SFT to be called more frequently from a SCUC solver, leading to a significant increase in overall efficiency and better quality results. The fast SFT can be provided as a service shared by multiple SCUC solvers or integrated with Security-Constrained Economic Dispatch (SCED).

According to one aspect, the disclosed technologies can be implemented as computer-readable media containing first, second, and third instructions which, when executed by one or more hardware processors, cause certain operations to be performed for a method of feasibility testing on a candidate solution for an electrical power grid. The first instructions cause multiple matrices to be precomputed. The precomputed matrices include a base case sensitivity matrix and two or more contingency matrices. A maximum size of the precomputed matrices is at most I×N, where I is a number of monitored branches in the power grid, and N is a number of transactional nodes in the power grid. The second instructions use the precomputed matrices to evaluate the candidate solution, and the third instructions cause output of a list of one or more violations of respective contingencies for the candidate solution.

Practical applications of the disclosed technologies are obtained in conjunction with an associated power grid. Embodiments of the disclosed technologies can be coupled to receive signals from the power grid and to transmit signals to the power grid. The received signals can indicate outages or other conditions of the power grid, so that evaluation of proposed solutions accurately incorporates the condition of the power grid and its components. For example, a substation or transformer can be out of service for maintenance, or a power line can be operating at reduced capacity because of environmental conditions. Signals transmitted to the power grid can include messages to program a generator coupled to the grid to supply a particular amount of power in a given time period, or to notify a load of an amount of power the grid can provide during the given time period. These signaling capabilities avoid scenarios where a planned power configuration tries to implement power flow over a line which is out of service, and other scenarios where a load draws too much power from the grid relative to a planned amount of available power, or a generator supplies too little power to the grid relative to planned loads.

In some examples, the candidate solution can include a vector of power injections at the transactional nodes. The contingency matrices can include, for a given contingency, a pair of factor matrices (Xk, Yk) having a common dimension equal to a rank (sk) of the given contingency. A product of the pair of factor matrices can represent a contingency sensitivity matrix for the given contingency, wherein a size of the product is at most I×N. The third instructions can also cause one or more sensitivities to be output. Each sensitivity can be a sensitivity of a corresponding power flow of a monitored branch to a change in power injection at a respective transactional node. The power grid can include J buses, and all calculations involving matrices of size I×J or size J×J can be included in the first instructions. For example, the first instructions can include Cholesky decomposition of a bus admittance matrix.

In further examples, the contingency matrices can include, for branch perturbations of each contingency, at least a left branch perturbation matrix and a right branch perturbation matrix. Multiple contingencies can have a same branch rank. A group contingencies can have a same given branch rank of at least two. Precomputation can include formation of a three-dimensional array by stacking the left branch perturbation matrices for the group of contingencies having the given branch rank. Another three-dimensional array can be formed by stacking the right branch perturbation matrices for these contingencies. The three-dimensional arrays can be used by the second instructions to compute perturbation power flow values for the group of contingencies, together.

In additional examples, the second instructions, when executed, can extract a subset of the monitored branches, wherein a complement of the subset has no contribution to any contingency violation. One or more branch and contingency violation pairs can be determined, from the perturbation power flow terms for the subset of monitored branches, for which a respective predetermined branch flow constraint is violated; and each of the branch and contingency violation pairs is included in the list of one or more violations.

In some examples, the contingency matrices can also include a left bus perturbation matrix and a right bus perturbation matrix for bus perturbations of each contingency. The bus perturbation matrices can also be stacked, like the branch perturbation matrices, and used to compute the perturbation power flows for groups of contingencies.

In further examples, the computer-readable media can store fourth, fifth, or sixth instructions. When executed, the fourth instructions can cause constraints from the list of violations to be incorporated into a SCED problem. The SCED problem can be solved by continuous refinement and a certified feasible, refined solution to the SCED problem can be outputted. The fifth instructions, when executed, can cause processors to receive data from sensors of the electrical power grid indicating outage or status of one or more components of the electrical power grid. The received data can be incorporated into configuration data associated with the electrical power grid and stored. The precomputation can be based at least partly on the stored configuration data. The sixth instructions, when executed, can cause hardware processors to send a signal, based on the list of violations, that causes the electrical power grid to control a magnitude of power injection at a load or a generator coupled to the electrical power grid during a future time period. The evaluation of the candidate solution can be for the same future time period.

In another aspect, the disclosed technologies can be implemented as a computer-implemented method. Input data is obtained for a simultaneous feasibility test (SFT) for one or more candidate solutions of a security constrained unit commitment (SCUC) problem of an electrical power grid. The electrical power grid is characterized by a number of bus nodes (J), a number of transactional nodes (N), and a number of monitored branches (I), and the SCUC problem is subject to a number of contingencies. A plurality of intermediate matrices are precomputed. A given candidate solution is received as a vector of length N. For the received candidate solution, a base case branch power flow and perturbation branch power flows (for each contingency) are computed, each of which can be a vector of length up to I. First branches are determined for which power flow constraints defined by a power flow limit vector are satisfied for all of the contingencies. Second branches are determined by excluding the first branches from the I monitored branches. The base case power flow and the perturbation branch power flows are combined for the second branches and for each of the contingencies, to determine branch-contingency pairs for which respective components of the power flow limit vector are exceeded. The number of such branch-contingency pairs can be denoted as V. Sensitivities to power injections at the transactional nodes are determined as a matrix of size up to V×N. The branch-contingency pairs and the sensitivities are returned as results of the SFT for the given candidate solution.

The electrical power grid can also be further characterized by a number of bus nodes (J), and the contingencies can have respective branch rank ($sk^{br}$) and respective bus rank ($sk^{bu}$). In some examples, the input data can include any two or more of: a bus admittance matrix (size up to or equal to J×J), a branch admittance matrix (size up to or equal to I×I), a topology matrix (size up to or equal to J×I), a power flow limit vector (size up to or equal to I); or, for each contingency: bus participation inputs for one or more of the bus nodes, a topology perturbation matrix (size up to or equal to J×$sk^{br}$), or a branch admittance perturbation matrix (size up to or equal to $sk^{br}$×$sk^{br}$). The precomputed matrices can include two or more of: a base case sensitivity matrix (size up to or equal to I×N), or, for each contingency, a left-hand branch perturbation matrix (size up to or equal to I×$sk^{br}$), a right-hand branch perturbation matrix (size up to or equal to N×$sk^{br}$), a left-hand bus perturbation matrix (size up to or equal to I×$sk^{bu}$), or a right-hand bus perturbation matrix (size up to or equal to N×$sk^{bu}$).

In another aspect, the disclosed technologies can be implemented as a system having one or more hardware processors with coupled memory coupled, and computer-readable storage media with instructions which, when executed by the one or more hardware processors, cause the system to perform the following operations. A security-constrained unit commitment (SCUC) problem for an electrical power grid is solved with a SCUC solver, by generating a succession of two or more candidate solutions in one pass over a search space. The SCUC solver calls a simultaneous feasibility test (SFT) multiple times for respective ones of the candidate solutions. A determination is made that the SCUC problem is solved, and a solution to the solved SCUC problem, from the single pass over the search space, is outputted.

In some examples, the operations can include receiving a list of one or more violations, in response to calling the SFT, and updating constraints of the SCUC problem, based on the list, during the single pass. In additional examples, the operations can include receiving, in response to calling the SFT, sensitivities of the one or more violations, relative to values of injected power at respective transactional nodes. The single SCUC pass can be guided based on the received sensitivities. The solving can be performed by a branch-and-bound search over a domain of a mixed integer programming problem. The SCUC solving can be terminated upon receiving an indication from the called SFT that an instant candidate of the candidate solutions has no violations, and the outputted solution can be determined as the instant candidate.

In further examples, the SCUC solver can be a first solver of multiple SCUC solvers, and the operations can also include performing the SFT by an SFT service concurrently accessible to each of the SCUC solvers. Two of the SCUC solvers can solve respective SCUC problems for different electrical power grids. An SCUC solver can issue a non-blocking call to the SFT service. In other examples, two of the SCUC solvers can solve respective SCUC problems for distinct future time periods of a same electrical power grid. In further examples, two of the SCUC solvers can solve the same SCUC problem for the same time period of the same electrical power grid. The SCUC solvers can exchange intermediate results (e.g. candidate solutions or SFT results) in one or both directions.

The operations can also include receiving data from sensors of the electrical power grid indicating outage or status of one or more components of the electrical power grid, and incorporating the received data into configuration data associated with the electrical power grid. The SCUC problem or the SFT can be configured based at least partly on the configuration data or on the received data. Still further, the operations can include sending a signal, based on the solution to the solved SCUC problem, that causes the electrical power grid to control a magnitude of power injection at a load or a generator coupled to the electrical power grid during a future time period. The future time period can be a time period for which the SCUC problem was solved.

The foregoing and other objects, features, and advantages of the disclosed innovations will become more apparent from the following detailed description, which proceeds with reference to the accompanying figures.

DETAILED DESCRIPTION

I. Introduction

Figure 1:
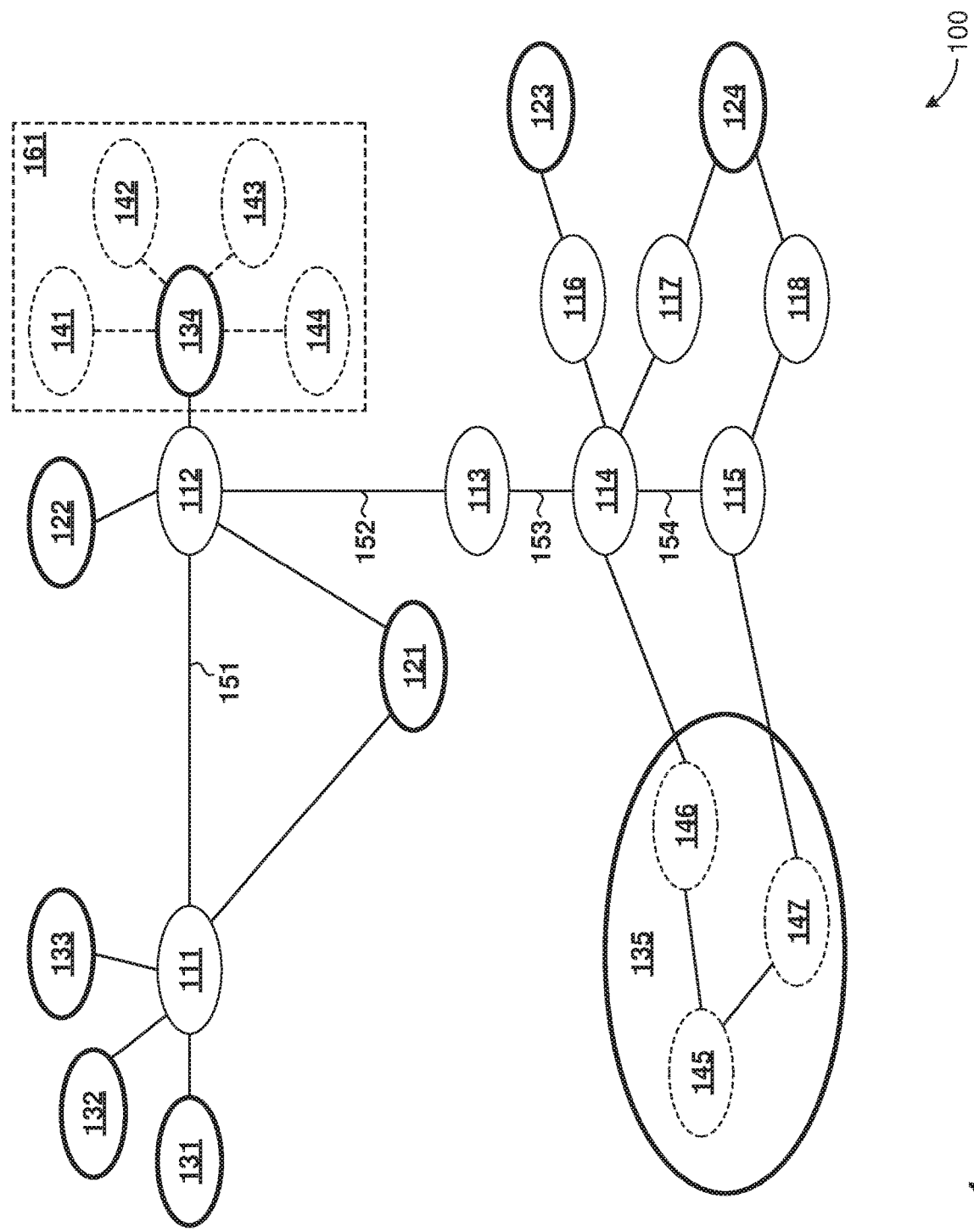
FIG. 1 is a diagram of an example power grid to which the disclosed technologies can be applied.

An electrical power grid can be modeled as a graph. When power is injected at certain points (e.g. a power station) or extracted at certain points (e.g. factories or residential neighborhoods), the resulting power flows throughout the network can be solved by network analysis techniques. However, the components of a power grid are physical entities with physical limitations (e.g. a maximum current rating), and operation of the grid requires that the physical constraints be met. The analysis thus far is dubbed a "base case" analysis. Additionally, a fault in a power grid can cause power flows in the grid to redistribute instantly, which can lead to further faults, in a cascade. To protect against such catastrophic scenarios, the power grid can be analyzed in various contingencies, to ensure that when one or a few components of the grid fail, the redistributed power flows remain within safe limits. SFT can be used as a tool for checking constraints under both base case and contingencies.

SFT can also be implemented with a matrix formulation, for example with matrices for power lines, other matrices for nodes (e.g. sources, loads, substations), further matrices for defining relationships between the power lines and the nodes, and so forth. However, because a typical power grid can have tens of thousands of nodes (sometimes over $10^4$ nodes), together with a comparable number of power lines, the associated data structures can be very large. Moreover, operations such as matrix multiplication or matrix inversion can scale as $n^3$, meaning that $\sim 10^{12}$ operations could be required for just one operation: taking the inverse of a $10^4 \times 10^4$ matrix. This is a significant challenge even with a cluster of gigahertz processors, and there can be dozens or hundreds of matrix operations in a single SFT evaluation. Still further, the problem served by SFT, namely Security-Constrained Unit Commitment (SCUC), is itself an NP-hard problem, meaning that there is no known polynomial time algorithm for finding an optimal solution. SCUC solvers apply different approaches to find a "good enough" solution in "good enough" time. SCUC has real-time requirements in that, for a day-ahead market, 24 separate solutions (and sometimes more) must be determined for 24 one-hour operating intervals, and SFT must fit within time budgets to meet these requirements. In fact, a day-ahead market often works with 36 one-hours intervals, covering a day and a half. The disclosed technologies can also be applied for 15-minute markets, requiring 96 intervals to be solved for each one-day period. The disclosed technologies can be applied to market configurations as well.

In fact, because of the unfavorable scaling with grid size, and recent trends for modern power grids to have increasing numbers of participants (e.g. progressively increasing penetration of distributed generation resources), the SCUC+SFT computational problem is among an uncommon class of physical-world problems where the demand for computation has been increasing even faster than the performance of computers. The disclosed technologies directly address the scaling problem by using smaller matrices and better organized computation than conventional technologies.

The disclosed technologies have been tested against a state of the art conventional SFT solver, and have been found to offer speed-up by about a factor of 60. In tests, the conventional solver took about 600 seconds on representative SFT problems, while an embodiment of the disclosed technologies completed the same tasks in 5-20 seconds. Such an improvement promises to revolutionize the computational aspects of modern power grid management. Not only does fast SFT free up time budgets for the main SCUC problem, but having fast SFT allows SFT to be called numerous times during a SCUC problem and enables new approaches for SCUC. For example, a SCUC solver can be guided by interim SFT evaluation results, even within a single-pass of a branch-and-bound search. Such improvements directly translate to improved operation of the power grid: "good enough" solutions can be replaced with superior or near-optimal solutions; and "best-that-was-found" solutions, which may not even satisfy all constraints and contingencies, can be replaced with secure solutions that do meet all constraint and contingency requirements. In varying examples, improvements can take the form of improved security for a given operating cost, or reducing operating cost for a particular level of security guarantee. For example, without an adequate security guarantee, a power grid operator can be required to default on a commitment to a generator or to a load, leading to a significant penalty. With the disclosed technologies, the incidence of penalties can be greatly reduced.

In part, the disclosed technologies include several distinct techniques that contribute to the demonstrated performance improvements. Innovations in formulation include setting up the computation based on power injection at just transactional nodes of a power grid rather than for all nodes including infrastructure nodes. In typical power grids, this can drop sizes of some matrices by about a factor of 10. Innovations in organization of the computation include exemplary features of precomputing matrices, using sparse matrices, preferring low-rank to high-rank matrices, organizing matrix operations to reduce the number of multiplication operations required, consolidating two-dimensional arrays into three-dimensional arrays, or eliminating branches that can be shown to have no contingency violations. Such innovations, in varying combinations, directly lead to more efficient computation of SFT as compared to conventional technology. Particularly, the number of computation operations, the amount of memory storage required, and the required computation time can each be reduced by respective factors of 10 or more.

In part, the disclosed technologies include distinct improvements to the SCUC solver environment in which SFT is deployed. One innovation is a single-pass branch-and-bound SCUC, with multiple SFT calls for respective candidate solutions. Another innovation is providing fast SFT as a service shared by multiple SCUC solvers. A further innovation is integration of SFT with a continuous refinement solver for a Security-Constrained Economic Dispatch (SCED) problem, for an improved optimization of SCUC and SCED in parallel.

These and other aspects of the disclosed technologies are described further herein.

II. Terminology

To facilitate review of the various embodiments, the following explanations of terms are provided. Occasionally, and where clear to a person of ordinary skill in the relevant art from the context, a term may also be used in a different meaning.

1. Electrical Power Grids

As used in this disclosure, an "electrical power grid" is a physical network for distribution of power between multiple participants. The participants can include one or more electrical power suppliers (dubbed "generators") such as power plants, including renewable or distributed energy sources, other grids; or energy storage facilities. The participants can also include one or more users of electricity (dubbed "loads") such as end users, including industrial, transportation, commercial, or residential users; aggregate users, such as municipal utilities; other grids; or energy storage facilities. The grid can include infrastructure such as power lines, substations, or switchgear, as well as facilities for interconnecting with participants or other grids. Some grids can be operated by Regional Transmission Organizations ("RTOs") or Independent System Operators ("ISOs"). Further terminology regarding power grids is introduced in the context of FIG. 1 below.

2. Examples of Physical Problems to be Addressed by the Disclosed Technology

As used in this disclosure, "Security-Constrained Unit Commitment" ("SCUC") refers to a type of Unit Commitment ("UC") problem to be solved for managing an electrical power grid. In some examples, UC refers to allocating commitment states and generation levels of multiple generators in a network to meet demands, typically for clearing bids in a future market such as a day-ahead market. However, to operate the power grid securely, i.e. within safe operating conditions of all grid components, additional constraints can be imposed, leading to the SCUC problem formulation. While some SCUC problems aim to determine generation levels under an assumption that all loads can be satisfied, this is not a requirement. In other SCUC problems, commitments states and usage levels of loads can also be allocated. That is, a load can have all, none, or part of its bid satisfied in the market. Further, a SCUC problem can combine variable generators or loads (whose allocation is to be determined) with preset generators or loads (whose power transfer amounts are not subject to allocation). For example, some generators can have power transfer amounts determined by e.g. a long-term contract rather than by market clearing, and some loads can be committed either to a contract or to a clearing market price. However, non-allocated generators or loads can impose power flows within the grid, and can be taken into account when analyzing security constraints.

SCUC problems for modern power grids can involve a large number of variables to be solved: thousands to hundreds of thousands of binary variables (e.g. commitment states ("ON", "OFF") of various grid participants) and even more continuous variables (e.g. allocated amounts of power generation for generators, or power consumption of loads; as well as power flows through thousands to hundreds of thousands of power lines and connected equipment).

The number of constraints can be comparable to the number of power lines in a grid, commonly in the tens of thousands. Computation effort for SCUC can increase rapidly as more constraints are imposed, and in some examples the constraint testing can be separated out, partially or wholly, from the SCUC problem. For example, SCUC can be solved with a few critical constraints, and a candidate solution can be separately tested for compliance with the remaining (or, all) constraints, e.g. by SFT.

As used in this disclosure, "mixed integer programming" ("MIP") is a formulation of an optimization problem over a set of variables, at least one of which is restricted to integer values. SCUC optimization can be defined in terms of an "objective function," wherein a goal of the optimization is to optimize (e.g. minimize or maximize) the objective function. Examples of objective functions can include, without limitation: total power losses in the power grid; a fraction of participants whose requirements (e.g. bids) are satisfied; a fraction of transaction bid amounts that are satisfied; a measure of total cost or total profit; or a measure of change from the determined solution of a previous market period. Commonly, SCUC can be formulated as a MIP with constraints that are linearly dependent on the variables ("linear constraints"), resulting in a "mixed integer linear programming" ("MILP") problem. Formulated as a MIP, SCUC can have binary commitment states as integer variables, and generation levels as continuous variables. A set of respective values for the set of variables, that has integer values for all the integer variables, and that satisfies the constraints is dubbed an "integer feasible solution" or simply "feasible solution." As feasible solutions are unearthed during the optimization process, the current best (on the basis of the objective function) among discovered feasible solutions is dubbed the "incumbent solution."

As used in this disclosure, "branch-and-bound" is a technique for solving an optimization problem in which a solution space is represented as a tree and branches of the tree are successively evaluated. An initial evaluation of a branch can sometimes demonstrate that the optimal solution within that branch is inferior to the incumbent solution, and the optimization procedure can continue without further examination of the subtree of that branch, leading to efficiency of the technique. SCUC MIP problems can be solved by branch-and-bound, but this is not a requirement. Numerous other techniques to solve optimization problems are available, including without limitation genetic algorithms, simulated annealing and other stochastic methods, Boolean satisfiability, linear programming, or particle swarm optimization.

As used in this disclosure, "Simultaneous Feasibility Test" ("SFT") refers to a procedure for validating a candidate SCUC solution against constraints and contingencies. A candidate solution can be an integer feasible solution that is better than the current incumbent solution, but this is not a requirement. In certain examples, SFT can be called on candidate solutions that are not superior to the incumbent solution (for example, if the incumbent solution does not satisfy one or more constraints under the base case or contingencies), or even on all integer feasible solutions, optionally subject to some criterion.

As used in this disclosure, "limit" is a rated operating parameter of a power grid component, such as rated current for a transmission line (which can include both real and reactive power flow), or a kVA rating for a substation transformer. A "constraint" can be based on a limit, and can be expressed as an inequality, for example power flow in a particular branch should not exceed 30 MW. A "contingency" is a hypothetical state of the grid in which the topology or constraints of the grid have changed. A contingency can be a scenario of an outage, fault, or degradation in a power grid, such as a fault causing a switchgear component to trip, taking one or more power lines or node equipment out of service. Secure grid operations can involve protection against cascaded faults, so that if a given fault occurs, and the grid adjusts to its changed topology, the adjusted grid should remain within all constraints. A contingency can involve outage or degradation of a single power grid component, or multiple components. Contingencies can be predetermined for a given power grid, and the response of the grid to each contingency can also be predetermined prior to SFT on a given candidate solution. A constraint that is not satisfied in the base case, or in a contingency, is dubbed a "violation." A violation can be specified by an entity within the power grid (e.g. a branch) whose constraint is violated, and optionally an identifier of the contingency resulting in such violation. In some examples, a tuple reporting the violation can include a parameter value of the violation, such as a branch power flow (e.g. 35 MW), or the percentage of the violated parameter relative to its constraint (e.g. 130%).

Depending on the depth of contingencies being evaluated, the number of contingencies can be comparable to the number of constraints (e.g. in the tens of thousands) for each time interval in the SCUC problem. Thus, SFT has been a formidable computing challenge. Given that clearing a day-ahead market requires analysis of 24 or 36 independent one-hour periods, a target time for complete SCUC+SFT computation of less than an hour has been challenging, particularly when a candidate solution can fail SFT, leading to multiple cycles of computation to arrive at a workable solution which, with conventional technologies, could still fail to satisfy all contingencies. With the variations and uncertainty introduced by penetration of renewable energy sources, the sub-hourly (e.g., 15-min) interval SCUC can require SFT support for 96 to 144 periods each day.

3. Computational Terminology

As used in this disclosure, "base case" refers to SFT parameters or analysis in the absence of any contingencies.

As used in this disclosure, the term "perturbation" is used in the context of SFT analysis of a contingency, under an assumption that changes to the power grid topology are small. The changes to various quantities (commonly arrays) are referred to as perturbations. A perturbation approach can be computationally efficient because it results in linear equations and allows linear system techniques to be applied. In examples, a formulation based on optimizing a Sherman-Morrison-Woodbury perturbation approach can be used.

As used in this disclosure, a "call" is an invocation of one software module (e.g. a function, subroutine, a service, thread, process, or a stand-alone program) from another software module. The two software modules can be running under a shared operating system, or can be in different computing environments. The two software modules can have shared memory or storage space, or not. Upon completion of its task, a called module can "return" or communicate results to its calling software module. Data can be communicated in one or both of the call and return, by passing parameters, messages, shared memory objects, or shared storage objects, in any combination. For example, an SCUC solver can call an SFT solver, and pass a candidate solution with the call. Upon completion, the SFT solver can return violations or sensitivities to the SCUC solver. In some examples, the calling software module can block awaiting results of the call, while in other examples the calling software module can continue without blocking.

As used in this disclosure, the term "precompute" refers to operations performed once by a called software module (e.g. SFT), for multiple calls to the called software module. In varying examples, precompute operations can be called responsive to or prior to the first call to the called software module. Results of the precomputation that can be shared among multiple calls are dubbed "intermediate," and can be data structures such as matrices, arrays, or tuples, or other data items.

As used in this disclosure, terms like "optimum," "optimize," "maximum," "maximize," "minimum," or "minimize" refer to selection of one of a number of possible entities (e.g. configurations, values, or data structures) as having a superior property compared to others of the possible entities, according to some predetermined criterion. Any number of possible entities can be evaluated, even as few as two. Particularly, optimization requires neither perfection nor an infinite search. Due to discrete data representations and finite computation time, an optimization procedure can successfully terminate without finding an exact extremum.

4. Data Structures

As used in this disclosure, an "array" is an ordered arrangement of data fields in one, two, three, or more dimensions. Arrays of one and two dimensions are referred to as "vectors" and "matrices" respectively. The number of elements or positions along each dimension is dubbed the "extent" or "length" of that dimension. The data fields in an array can variously have known values, or can be empty or unknown pending determination of such values. A data structure storing data fields of an array need not have the same structure as the logical structure of the underlying array. For example, a sparse 1000×1000 matrix with 8 non-zero elements can be accurately represented as eight triples, each triple containing the row and column indices of the corresponding element, along with its value. As a further example, an array of size E1×E2 can sometimes be stored as its transpose, of size E2×E1. An array is considered "sparse" if its number of non-zero elements is less than or equal to a predetermined threshold. For an array of N positions (that is, a 3×6 matrix can have N=3×6=18 positions), in various examples, the threshold for sparseness can be 0.5×N, 0.1×N, 0.01×N, √N, or another value.

Two or more N dimensional arrays having equal extent in N−1 dimensions, and extents E1, E2, ... in the remaining ($N^{th}$) dimension, can be "stacked" adjacent to one another in the Nth dimension to form an array having extent in the Nth dimension of E1+E2+ .... An N−1 dimensional array is equivalent to an N dimensional array with extent 1 in the Nth dimension. The Nth dimension can be in any position, and need not be the last among the dimensions. To illustrate, a 3×5 matrix can be equivalent to a 1×3×5 array, a 3×1×5 array, or a 3×5×1 array, and accordingly, two such 3×5 matrices can be stacked to obtain a 2×3×5 array, a 3×2×5 array, or a 3×5×2 array respectively.

As used in this disclosure, a "tuple" is an ordered collection of a predetermined number of data fields. Tuples of size one, two, three, and four can be referred to as "singlets," "pairs," "triples," and "4-tuples" respectively.

As used in this disclosure, the "size" of an array or tuple is a tuple indicating the number of data fields it can contain along each dimension of the array or along the length of the tuple. Thus, the size of a matrix having two rows and three columns can be 2×3, and is different from the 3×2 size of a matrix with three rows and two columns. The size of a tuple is its length (i.e. a singlet). Thus, the size of a triple is three.

A "maximum size" of an array can likewise be specified as extents along various dimensions (e.g. 2×3×4×5). In the latter case, an array is within the maximum size if each dimension has extent less than or equal to the specified limit. In some examples, an N-dimensional array can be specified to have a maximum size of $E_1 \times E_2 \times \ldots \times E_M$ in M<N dimensions, meaning that any M dimensional slice of the array can fit within a structure having extents $E_1, E_2, \ldots E_M$ in M dimensions. Thus, if a maximum size is called out as 4×4, then a three-dimensional array 3×2×3 is within the maximum size, because its largest 2-dimensional slice is 3×3, while a 3×5×3 array exceeds the maximum size, because its largest 2-dimensional slice, 3×5, has a dimension of extent 5 which cannot fit within the 4×4 limit.

As used in this disclosure, the "rank" of an array is used synonymously with the extent of the array in a particular dimension under consideration. The term rank is also applied in the context of contingencies, to refer to a number of buses or branches that are affected in that contingency. Thus, a contingency k can have a bus rank ($sk^{bu}$) and a branch rank ($sk^{br}$), referring to the affected number of buses or branches respectively. Often, a given contingency rank sk will lead to matrices or arrays having an extent sk, and so the dual usage of the term "rank" can be consistent.

The following sections summarize some of the quantities and symbols used in this disclosure.

4.1 Sizes and Indices

In Table 1, quantities are described in the middle column, a symbol for the number of such quantities is listed in the left column, and a corresponding index is listed in the right column. To illustrate, K contingencies can be defined on a power grid, and index k can identify a particular one of the contingencies. Contingency k can be associated with $sk^{br}$ perturbed branches and $sk^{bu}$ perturbed buses.

TABLE 1

| Size | Description | Index |
|---|---|---|
| $I^*$ | All branches | — |
| I | Monitored branches | i |
| $I^{OK}$ | Branches where contingency currents are guaranteed not to exceed constraint | i |
| $I^\diamond$ | Branches that could have violations, complement of $I^{OK}$; $I^{OK} + I^\diamond = I$ | i |
| J | All bus nodes | j |
| K | Contingencies | k |
| N | Transactional nodes | t |
| V | Violations | v |
| $sk^{br}$ | Contingency branch rank (also simply "branch rank"), number of branches perturbed for contingency k | i |
| $sk^{bu}$ | Contingency bus rank (also simply "bus rank"), number of buses perturbed for contingency k | j |
| s | Number of contingencies having a same value of either $sk^{br}$ or $sk^{bu}$ | — |

4.2 Base Case Data Structures

In Table 2, data structures are described in the right column, a symbol for the data structure is listed in the left column, and a usual size for the data structure is listed in the second column.

The third column lists a category of the data structure: "CC" identifies Configuration data structures that can be provided as inputs for a particular power grid or SCUC problem. "WW" data structures are temporary data structures that can facilitate computation, for example to reduce storage requirements or computation operations. "DD" identifies Data input specific to a particular SFT evaluation, commonly power injections or other parameters of a candidate solution. "II" identifies Intermediate data structures that can be precomputed and reused for multiple SFT evaluations on a single SCUC problem or on a common power grid. "OO" identifies data structures that can be output or returned to a calling program. In some examples, certain of these data structures can be omitted, or sized differently, and other data structures can be added.

To illustrate, M0 is a base case topology matrix with one dimension for J bus nodes, and the other dimension for I monitored branches. The second character "0" is used to distinguish the base case data structure M0 from a similar topology matrix Mk indicating topology changes in contingency k. Matrix M0 can be input as predetermined configuration data.

TABLE 2

| Symbol | Size | Type | Description |
|---|---|---|---|
| A | J × J | CC | Bus admittance matrix. Consistent with industry usage, the "admittance" components of this sparse matrix actually represent susceptance, in a DC power flow methodology. |
| C0 | I × I | CC | Branch admittance matrix, sparse. |
| D0 | I × N | OO | Sensitivity matrix of power flow in branch i to power injection in transactional node t under base case topology. The "sensitivity" is the partial derivative $\partial r_i / \partial q_t$ and is dimensionless. |
| E | J × N | CC | Maps power injection at transactional node t to power flow at bus node j. |
| F | J × J | WW | Cholesky factor of A, triangular. |
| M0 | J × I | CC | Sparse topology matrix indicating connection of branch i to node j. |
| Q | N | DD | Vector of power injections at transactional nodes, to be evaluated by SFT. q can represent a SCUC candidate solution. |
| $\bar{r}$ | I | CC | Branch power flow limits, expressed as positive numbers. |
| r0 | I | OO | Branch power flow. |

TABLE 2-continued

| Symbol | Size | Type | Description |
|---|---|---|---|
| Z | J × J | CC | Diagonal matrix to null out bus angle at reference bus node j = j0. |
| A | 1 | CC | Global constant related to bus participation factors. |

4.3 Contingency Data Structures

In Table 3, data structures are described in the right column, a symbol for the data structure is listed in the left column, and a usual size for the data structure is listed in the second column. Data structures having "k" as second letter, such as Ck, can have K instances, one for each contingency. Data structures having "s" as second letter, such as $Xs^{br}$, can be replicated for respective values of a corresponding perturbation rank $sk^{br}$, and are often 3-D arrays. The categories CC, WW, II, or SS for Configuration, Working, Intermediate, or Output data structures are similar to Table 2. In some examples, certain of these data structures can be omitted, or sized differently, and other data structures can be added. To illustrate, Mk is a sparse matrix with one dimension for J bus nodes and another dimension for the $sk^{br}$ branches affected by contingency k, some of which could experience an outage with associated topology change. Matrix Mk can be provided as configuration data for predetermined contingency k.

TABLE 3

| Symbol | Size | Type | Description |
|---|---|---|---|
| Bk | $J \times sk^{br}$ | WW | Right matrix factor for bus rebalancing in contingency k. |
| Ck | $sk^{br} \times sk^{br}$ | CC | Diagonal perturbation to branch admittance in contingency k. |
| D1 | V × N | OO | Sensitivity of branch current in branch-contingency violation v to power injection at transactional node t for violated contingencies k. |
| Gk | $J \times sk^{br}$ | WW | Left matrix factor for bus rebalancing in contingency k. |
| Hk | I × I | CC | Diagonal mask matrix for branches active in contingency k. |
| Hs | I × s × I | II | 3-D stack of Hk matrices. |
| Lk | $sk^{br} \times sk^{br}$ | WW | Triangular factor of working matrix Vk. |
| Mk | $J \times sk^{br}$ | CC | Sparse matrix of topology changes in contingency k. |
| r1 | $I^{\diamond}$ | OO | Branch power flows under contingency k, e.g. (i, k) component of r1 is the power flow on branch i under contingency k. |
| $rk^{br}$ | I | WW | Branch power flow for branch perturbation in contingency k. |
| $rk^{bu}$ | I | WW | Branch power flow for bus perturbation in contingency k. |
| $rMax^{br}$ | I | WW | Maximum perturbation power flow in branch i due to branch perturbations, across all contingencies. "Minimum" and "maximum" are algebraic minimum and maximum, i.e. maximum of 5 and −15 is 5; minimum of 5 and −15 is −15. Minimum and maximum can be denoted by functions min, max, which can be applied to sets of numbers. |
| $rMax^{bu}$ | I | WW | Maximum perturbation power flow in branch i due to bus perturbations, across all contingencies. |
| $rMin^{br}$ | I | WW | Minimum perturbation power flow in branch i due to branch perturbations, across all contingencies. |
| $rMin^{bu}$ | I | WW | Minimum perturbation power flow in branch i due to bus perturbations, across all contingencies. |
| $rs^{br}$ | I × s | WW | 3-D stack of branch power flows for branch perturbation. |
| $rs^{bu}$ | I × s | WW | 3-D stack of branch power flows for bus perturbation. |
| Uk | $sk^{br} \times sk^{br}$ | WW | Triangular factor of working matrix Vk. |
| Vk | $sk^{br} \times sk^{br}$ | WW | Working matrix. |
| Wk | $J \times sk^{br}$ | WW | Working matrix. |
| $Xk^{br}$ | $I \times sk^{br}$ | II | Left factor for branch perturbation power flow in contingency k, also "left branch perturbation matrix". |
| $Xk^{bu}$ | $I \times sk^{bu}$ | II | Left factor for bus perturbation power flow in contingency k, also "left bus perturbation matrix". |
| $Xs^{br}$ | $I \times s \times sk^{br}$ | II | 3-D stack of left factors for branch perturbation power flow. |
| $Xs^{bu}$ | $I \times s \times sk^{bu}$ | II | 3-D stack of left factors for bus perturbation power flow. |
| $Yk^{br}$ | $N \times sk^{br}$ | II | Right factor for branch perturbation power flow in contingency k, also "right branch perturbation matrix". |
| $Yk^{bu}$ | $N \times sk^{bu}$ | II | Right factor for bus perturbation power flow in contingency k, also "right bus perturbation matrix". |
| $Ys^{br}$ | $N \times s \times sk^{br}$ | II | 3-D stack of right factors for branch perturbation power flow. |

TABLE 3-continued

| Symbol | Size | Type | Description |
|---|---|---|---|
| $Ys^{bu}$ | $N \times s \times sk^{bu}$ | II | 3-D stack of right factors for bus perturbation power flow. |
| $\beta k$ | 1 | CC | Bus injection change factor for contingency k, can be expressed as a diagonal matrix. This factor contributes to the importance ("participation factor") for the various buses associated with contingency k. |
| $\sigma k$ | 1 | WW | Normalization constant for contingency k, can be expressed as diagonal matrix. |

III. Example Power Grid

FIG. 1 is a diagram of an example electrical power grid 100, represented as a graph of vertices (which can represent bus nodes and transactional nodes, described further below) and edges (which can represent power lines).

1. Power Grid Terminology

Edges of the graph represent power lines, which can include high voltage transmission lines (often, about 69 kV to about 1 MV) and medium voltage distribution lines (often, about 12 kV to 44 kV). In accord with industry practice, the edges of the graph are termed "branches." Different branches can operate in disparate modes, such as alternating current ("AC") or direct current ("DC") or at different voltages, with suitable transforming equipment at the nodes where disparate branches join. A physical power grid can include branches that can be omitted from evaluation of constraints, leaving "monitored branches" as those represented in various data structures or equations described herein. The amount of power flowing, e.g. measured in megawatts (MW), in a branch is dubbed "power flow."

Nodes of the graph such as 114 represent junctions between power lines or terminations of power lines, and can include equipment (such as transformers or switchgear at a substation) or external interfaces (for power plants or other generators; for factories or other loads; for interconnect to other grids including municipal utilities; or for other grid participants). In accord with industry practice, the nodes of the graph are termed "buses," and can be of two types: "transactional nodes" and "infrastructure nodes." A transactional node is a node at which power can be provided to the grid or delivered from the grid in a transaction between the grid operator and an external party, or between two external parties. A transactional node is sometimes called a "pricing node" or "p-node" in industry practice. The term "injection" refers to an amount of power supplied to the power grid (positive value of injection) or supplied from the grid (negative value of injection) at a given node. In some examples, power injection at transactional nodes is of particular interest. An infrastructure node is a node, commonly part of a grid infrastructure, at which power transactions do not occur. However, an infrastructure node can also have power losses, despite having no power transfers with external parties.

2. Computation Formulation

Different power grid computation models are used in industry. The present disclosure is directed to a "DC power flow" model, in which power flow (MW) in a branch joining two nodes is proportional to a product of (i) the phase angle difference between AC voltage waveforms on the two nodes, and (ii) the susceptance of the branch. Consistent with industry practice, the term "admittance" is used herein for the branch susceptance. Some of the innovations described herein are particularly applicable to the DC power flow model, others are more generally applicable but particularly advantageous for the DC power flow model, while further innovations are independent of the computation model used.

3. The Illustrated Grid

Illustrated grid 100 is greatly simplified. A real-world power grid can have 1,000 to 50,000 nodes. Of these, about 10 to 3,000 can be transactional nodes, commonly about 1,000 to 2,000 transactional nodes, with a mix between generators and loads. With growth of distributed and renewable generation capacity, the proportion of generators has been increasing over time. The number of branches can be comparable to the number of nodes.

In grid 100, transactional nodes 121-124 and 131-135 are shown in bold outline, while infrastructure nodes 111-118 are shown with lighter weight outlines. Starting at the top left of FIG. 1, node 111 can represent a substation through which loads 131-133 are served. To illustrate, loads 131-133 can be industrial plants. Branches 151-154 can form a main transmission corridor joining infrastructure nodes 111-115. Transactional nodes 121, 122 can represent power plants, connected by respective branches to nodes 111, 112 as shown. Also connected to node 112 is transactional node 134, which can be an interconnection point for a municipal utility 161, serving a mix of residential and commercial customers 141-144. Municipal utility 161 can handle its own clients and their transactions. Hence, other than interface 134, the nodes 141-144 of municipal utility 161 can be excluded from grid 100, in the context of the disclosed technology, and accordingly are shown with dashed outline. Node 114 can be an interconnect with a side corridor serving a remote power plant 123 via intermediate node 116. Power plant 124 can have redundant interconnect to the main corridor 111-115, tying to node 114 via intermediate node 117, and tying to node 115 via intermediate node 118.

Transactional node 135 can be similar to node 134, inasmuch as it serves nodes 145-147 that are coupled to but not part of grid 100, however node 135 can have two tie points to the rest of grid 100. To illustrate, nodes 146 and 147 can be distribution substations respectively receiving power from nodes 114 and 115 of the main corridor, and in turn serving a load at node 145. Further, node 135 is an example of a transactional node that is an aggregate of bus nodes 145-147, but is not a bus node itself.

The terms generator and loads are used as a matter of convenience. That is, a "generator" 121-124 normally delivers power to grid 100 and a "load" 131-135 normally receives power from grid 100. However, these are not requirements. In some circumstances, a node labeled as a generator can receive net power from the grid, for example when a power plant is down for maintenance and requires a small amount of power for auxiliary functions, or when a generator has rechargeable storage capacity and elects to recharge from the grid 100 rather than by generating its own power. Similarly, in some circumstances a node labeled as a load can provide power to the grid 100. For example, if nodes 141-144 are residences having their own renewable (e.g. solar) generating capacity or storage capacity, when their own electricity demand is low, transactional node 134 can provide net power to the grid 100.

IV. First Example SFT Method

Figure 2:
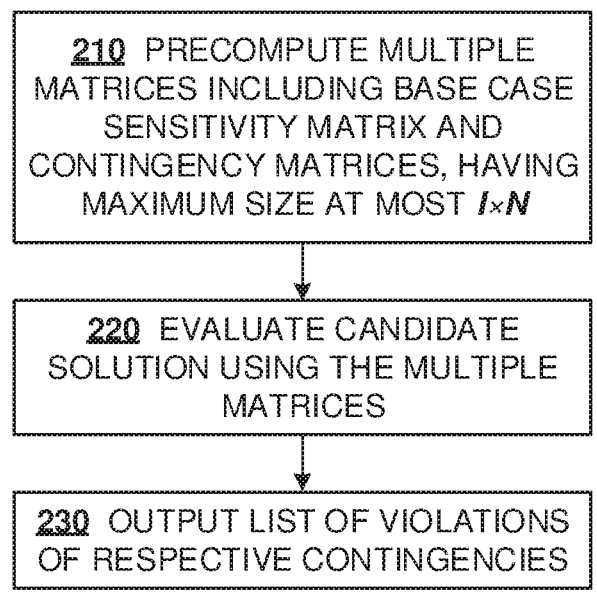
FIG. 2 is a flowchart of a first example SFT method according to the disclosed technologies.

FIG. 2 is a flowchart 200 of a first example SFT method. In this method, a precompute phase precedes evaluation of a candidate solution. A candidate solution to a SCUC problem can be provided along with a call from a SCUC solver. After SFT evaluation, results can be returned to the SCUC solver. The method can be performed by an SFT solver.

At process block 210, multiple matrices can be precomputed. A power grid graph can include I* branches, of which I are monitored for evaluation of constraints or contingencies. The power grid graph can include N transactional nodes. Then, the precomputed matrices can have maximum size of at most I×N. In examples, where precomputed data structures include arrays of three or more dimensions, any two-dimensional cross-section can have size at most I×N. As further described herein, the use of an I×N matrix instead of, say, an I×J matrix as in conventional technologies, directly translates to less data storage and less compute operations, for a significant increase in computing efficiency. Block 210 can use as input assorted data provided or retrieved from a configuration data store. The input data can include information about the power grid (e.g. topology of the power grid, and electrical properties of various grid components) and contingencies of interest (e.g. which bus node or branch components are involved in a given contingency). Exemplary input data are described further herein.

At process block 220, a candidate solution can be evaluated using the matrices precomputed at block 210. The candidate solution can be obtained via a call from an SCUC solver. In addition to the precomputed matrices, the evaluation at block 220 can also make use of constraints obtained from the data store. In some examples, constraints can be read in along with other input data, and retained for subsequent use at block 220. In varying examples, the evaluation at block 220 can determine a list of violations for respective branches under each contingency. Optionally, the evaluation can generate sensitivities of each violation to power injections at some respective transactional nodes. In varying examples, sensitivities can be evaluated for violated branches under each violated contingency, a predetermined set of contingencies, all contingencies, a predetermined set of branches, or all monitored branches, in any combination.

Then, at process block 230, a list of the violations determined at block 220 can be output for respective contingencies or branches. Additionally or alternatively, sensitivities of each violation to power injections at some respective transactional nodes can be output. The outputs can be returned to the SCUC solver.

Numerous variations and extensions of the first method can be implemented within the scope of the disclosed technologies, including several described herein. In some examples, the candidate solution can be a vector of power injections at up to N transactional nodes. Process block 210 can include computations with matrices of size I×J or J×J, such that all computation with matrices of these sizes are included within precompute block 210. Absence of matrices of size I×I or I×J from process block 220 can speed up the average time for SFT evaluation significantly. For example, input data can include a bus admittance matrix of size J×J, which can be factored using Cholesky decomposition within block 210. The matrices calculated at block 210 can include left and right perturbation matrices for the branch perturbations associated with each contingency, and can include left and right perturbation matrices for the bus perturbations associated with each contingency. The various contingencies can have respective ranks $sk^{br}$ for branch perturbations and respective ranks $sk^{bu}$ for bus perturbations. To illustrate, a given contingency can have $sk^{br}=3$ and $sk^{br}=2$. Then, all left branch perturbation matrices of rank $sk^{br}=3$ can be aggregated into a 3-D array, and similarly for right branch perturbation matrices. Likewise, all left bus perturbation matrices of rank $sk^{bu}=2$ can be aggregated into a 3-D array, and similarly for right bus perturbation matrices, resulting in typically a few dozen consolidated 3-D arrays for the various ranks $sk^{br}$, $sk^{bu}$.

Use of 3-D arrays can further speed up computation at block 220, as compared to computing each contingency separately. That is, at block 220, contingency power flow terms can be computed for the various contingencies using the 3-D arrays. These contingency power flow terms can also be obtained as 3-D arrays, and can be evaluated without expensive matrix permutations to determine which branches are free of any constraint violation in any contingency. A complement of these violation-free branches can be retained or extracted as a subset of all branches, for further analysis. Then, the branches in the subset can be individually evaluated to determine which, if any, constraints are violated, leading to a list of branch-contingency violation pairs. Each such pair includes an identifier of a branch and an identifier of a corresponding constraint that is violated. Additionally, each pair can be part of a larger structure, such as a triple, 4-tuple, etc., the additional fields denoting quantities such as branch power flow, an extent of violation (e.g. 130% of rated capacity), or another parameter related to the branch, the contingency, or the violated constraint.

V. Example Dataflow Diagram

Figure 3A:
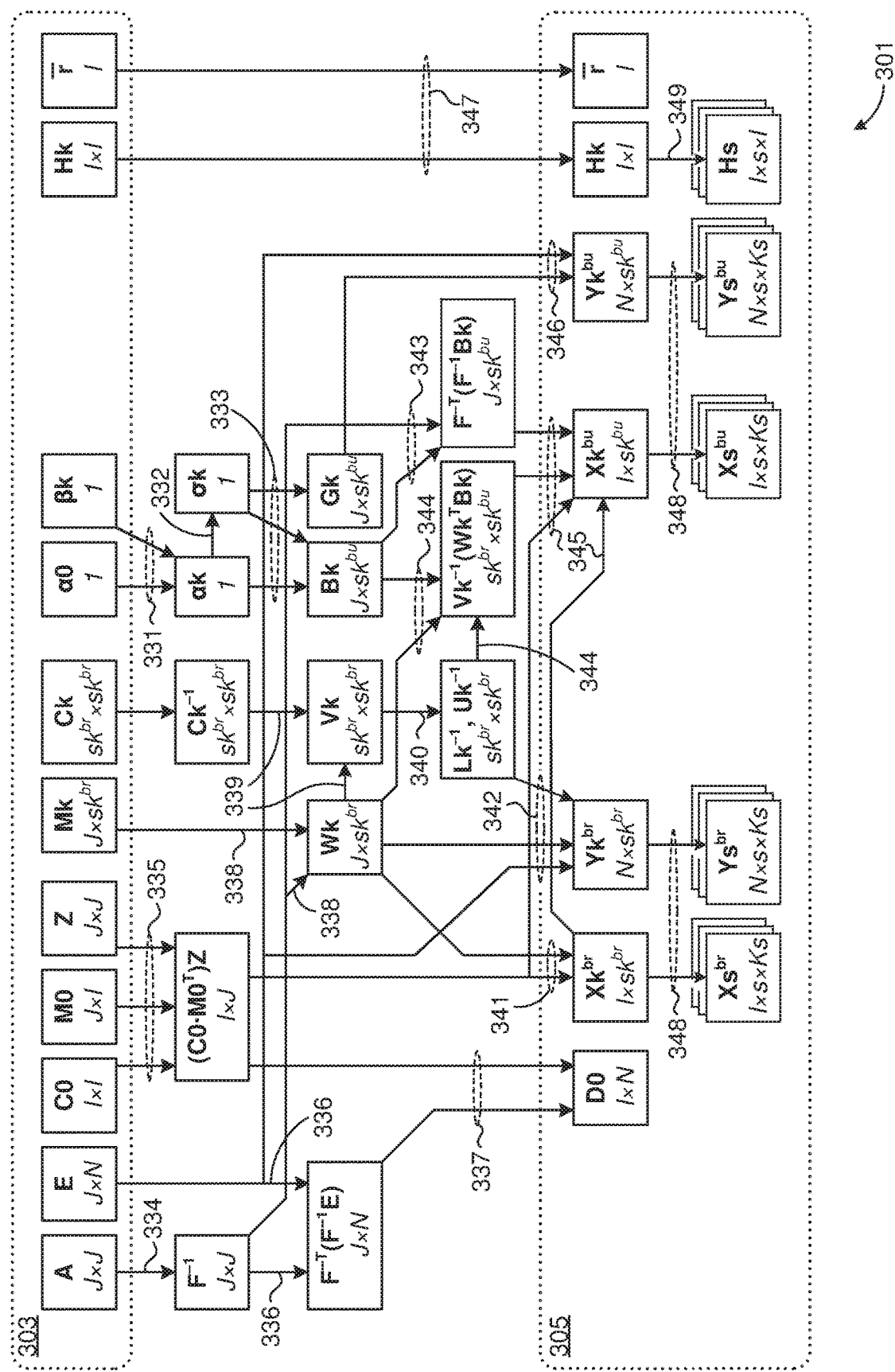
FIGS. 3A-3B are parts of an example dataflow diagram according to the disclosed technologies.
Figure 3B:
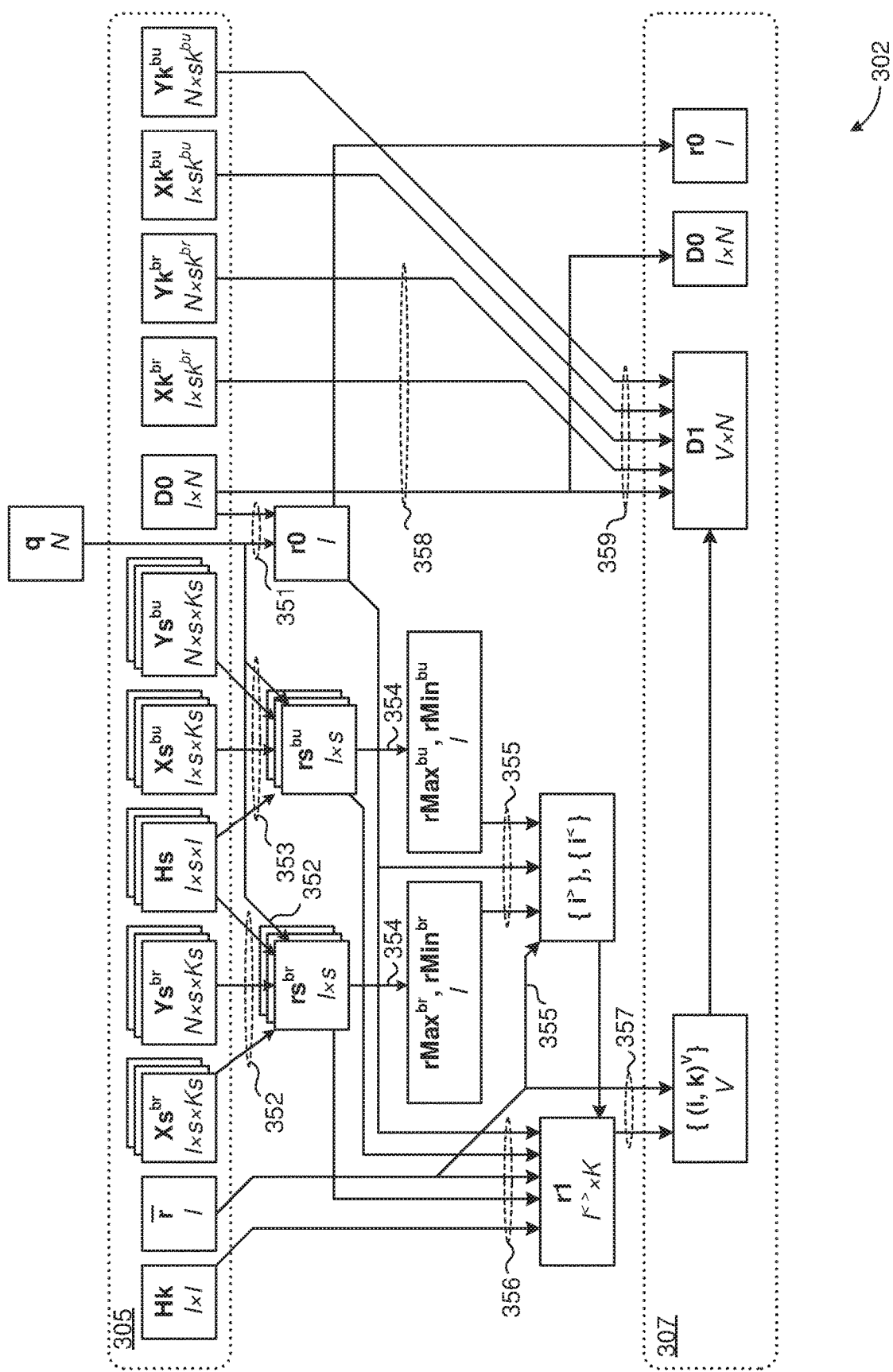

FIGS. 3A-3B are parts 301, 302 of an example dataflow diagram according to the disclosed technologies. Details of an exemplary SFT implementation are described in the context of FIGS. 3A-3B, together with examples of pseudo-code in the tables below. The details described can be included, individually or severally, in other examples of the disclosed technology. FIGS. 3A-3B are illustrative, and many variations can be made to the data items, their organization, or the organization of the related operations, within the scope of the disclosed technologies.

1. Notation

The notation of FIGS. 3A-3B generally matches that used elsewhere in this disclosure. Each data item is shown in a box, with the name of the data item on the first line, and its size on the second line. For example, branch admittance matrix C0 is listed as having a size I×I. Most depicted data items are matrices, a few are vectors (e.g. $\bar{r}$) or scalars (e.g. $\alpha 0$), a few are lists (e.g. $\{i^>\}$), and a few are 3-D arrays (e.g. $Xs^{br}$, illustrated as a stack of boxes). Where the same symbol is used for both base case and perturbation analysis of contingencies, a "0" is appended to the base case data item and "1" or "k" is appended to the perturbation data item. Thus, D0 and D1 for sensitivities, and C0 and Ck for bus admittance matrices. The "k" indicates that there are multiple such data items, commonly one for each contingency k, and K in total, even though only a single data item (e.g. $Xk^{br}$) is shown in FIGS. 3A-3B. Thus, any of the matrices denoted with "k" in the symbol (such as Ck, Mk, Xk, Yk)

can be dubbed a "contingency matrix." Similarly, an appended "s" indicates that there are multiple such data items (e.g. $Xs^{br}$) commonly one for each rank $sk^{br}$ or $sk^{bu}$. Superscripts br, bu denote that the quantity pertains to branch perturbations or bus perturbations respectively, and are sometimes omitted where the description pertains generically to either type of perturbation.

2. Overview

Table 4 illustrates an overview of an example SFT procedure.

TABLE 4

SFT procedure

| | |
|---|---|
| L200 | Read configuration data from files. |
| L201 | Perform precomputation. |
| L202 | Begin loop |
| L203 | Receive vector q of injections at transactional nodes |
| L204 | Perform evaluation of q for base case, constraints, and contingencies. |
| L205 | Output violations $\{i^r\}$, $\{(i, k)^r\}$; branch flows r, r1; sensitivities D, D1. |
| L206 | End loop |

At operation L200, configuration data pertaining to a power grid can be read from files. The configuration data can include some or all of the items 303 indicated in FIG. 3A and detailed at Section (II)(4.2-4.3) herein. At operation L201, precomputation can be performed similar to the illustration of FIG. 3A, or process block 210, and described further below. Operations L202-L206 form a loop, as the SFT solver can be called repeatedly for different inputs (e.g. candidate solutions of a SCUC problem). At operation L203, a vector q of injections at transactional nodes can be input to the SFT solver, and at operation L204, the vector q can be evaluated with respect to predefined constraints and contingencies. Operation L204 can be similar to the illustration of FIG. 3B, process block 220, or as described further below. At operation L205, evaluation results can be output. Example outputs can include one or more of: a list of branches having violations; a list of branch-contingency pairs with violations; branch flows r0 (base case), r1 (contingencies); sensitivities D0 (base case), D1 (contingencies).

3. Precomputation

Table 5 illustrates an example of precomputation, similar to operation L202.

TABLE 5

Precomputation

| | |
|---|---|
| L300 | Compute $\alpha k$, $\sigma k$ |
| L301 | Construct Bk, Gk |
| L302 | Compute Cholesky factors F, $F^T$ of bus admittance matrix A |
| L303 | Compute $(C0 \cdot M0^T)Z$ |
| L304 | Compute $F^{-T}(F^{-1} \cdot E)$ |
| L305 | Compute base case sensitivity matrix D0 |
| L306 | Compute working matrix Wk |
| L307 | Compute working matrix Vk |
| L308 | Compute triangular factors Lk, Uk of Vk by L-U factorization |
| L309 | Compute left branch perturbation matrix $Xk^{br}$ |
| L310 | Compute right branch perturbation matrix $Yk^{br}$ |
| L311 | Compute working matrix $F^{-T}(F^{-1} \cdot Bk)$ |
| L312 | Compute working matrix $Vk^{-1}(Wk^T \cdot Bk) = Uk^{-1} \cdot (Lk^{-1} \cdot (Wk^T \cdot Bk))$ |
| L313 | Compute left bus perturbation matrix $Xk^{bu}$ |
| L314 | Compute right bus perturbation matrix $Yk^{bu}$ |

At operation L300, a bus participation factor can be adjusted for bus change factors for each contingency, according to Equation E3.1, and a normalizing constants can be computed for each contingency, according to Equation E3.2. Arrows 331, 332 in FIG. 3A represent similar operations.

$$\alpha_k = (1+\beta_k)\alpha \tag{E3.1}$$

$$\sigma_k = 1^T \alpha_k \tag{E3.2}$$

At operation L301, left and right matrix factors for bus rebalancing can be extracted from the diagonal left-hand side of Equation E3.3. Arrows 333 in FIG. 3A represent similar operations.

$$\beta_k - 1/\sigma_k(1+\beta_k)\alpha 1\beta_k = B_k G_k^T \tag{E3.3}$$

At operation L302, a triangular factor F of bus admittance matrix can be computed by Cholesky decomposition, and inverted. Arrow 334 in FIG. 3A represents similar operations.

At operation L303, intermediate matrix $(C0 \cdot M0^T)Z$ can be computed in the order indicated by the parentheses, similar to arrows 335 of FIG. 3A.

At operation L304, intermediate matrix $F^{-T}(F^{-1} \cdot E)$ can be computed in the order indicated by the parentheses, similar to arrows 336 of FIG. 3A. Superscript "$-T$" (e.g. $F^{-T}$) denotes the transpose of the inverse of the corresponding matrix (namely F). In some examples, $F^{-1} \cdot E$ can be computed by solving $F \cdot \Gamma = E$ to obtain $F^{-1} \cdot E = \Gamma$, and similarly for the multiplication by $F^{-T}$.

At operation L305, base case sensitivity D0 can be computed following Equation E3.4, similar to arrows 337 of FIG. 3A. In Equation E3.4, and elsewhere in this section, square brackets denote expressions that have previously been computed, e.g. at operations L303, L304.

$$D0 = [(C0 \cdot M0^T)Z] \cdot [F^{-T}(F^{-1} \cdot E)] \tag{E3.4}$$

At operations L306, L307, working matrices Wk, Vk can be computed according to Equations E3.5, E3.6, and at operation L308 LU decomposition can be applied to Vk as indicated by Equation E3.7, and the factors Lk, Uk can be inverted. Similar operations are depicted by arrows 338-340 in FIG. 3A.

$$Wk = F^{-T}(F^{-1} \cdot Mk) \tag{E3.5}$$

$$Vk = (Ck)^{-1} + (M0^T \cdot Wk) \tag{E3.6}$$

$$Vk = Lk \cdot Uk \tag{E3.7}$$

At operations L309, L310, left and right matrix factors for branch flows due to contingency branch perturbations can be computed according to Equations E3.8, E3.9. Similar operations are depicted by arrows 341-342 in FIG. 3A.

$$Xk^{br} = [(C0 \cdot M0^T)Z] \cdot Wk \tag{E3.8}$$

$$Yk^{br} = ((E^T \cdot Wk) \cdot Lk^{-T}) \cdot Uk^{-T} \tag{E3.9}$$

At operations L311, L312 working matrices $F^{-T}(F^{-1} \cdot Bk)$ and $Uk^{-1} \cdot (Lk^{-1} \cdot (Wk^T \cdot Bk))$ can be computed in the order indicated by the parentheses. Arrows 343-344 in FIG. 3A denote similar operations.

At operation L313, L314, left and right matrix factors for branch flows due to contingency bus perturbations can be computed according to Equations E3.10, E3.11. Similar operations are depicted arrows 345-346 in FIG. 3A.

$$Xk^{bu} = Xk^{br} \cdot [Uk^{-1}(Lk^{-1}(Wk^T \cdot Bk))] - [(C0 \cdot M0^T)Z] \cdot [F^{-T}(F^{-1} \cdot Bk)] \tag{E3.10}$$

$$Yk^{bu} = E^T \cdot Gk \tag{E3.11}$$

In some examples, mask matrix H and branch constraints $\bar{r}$ can also be read in at operation L200, but may not be used within the precomputation of operation L201. These and similar quantities can be passed on with precomputed intermediate matrices 305 as indicated by arrows 347.

In further examples, the X, Y matrix factors for perturbation branch flows can be stacked according to rank as indicated by arrows 348. To illustrate, consider an example with contingencies k=1-4 having respective branch ranks $sk^{br}=4, 5, 4, 5$ and respective bus ranks $sk^{bu}=2, 3, 3, 2$. Then for k=1, 3 the $Xk^{br}$ matrices have size I×4 and can be stacked to form a 3-D array $Xs^{br}$ of size I×4×2. Similarly, for k=2, 4 the $Xk^{br}$ matrices can be stacked to obtain a 3-D array $Xs^{br}$ of size I×3×2. Stacking for the $Yk^{br}$ matrices is similar and produces $Ys^{br}$ matrices of size N×4×2 (for k=1, 3) and N×3×2 (for k=2, 4). Stacking for bus perturbations can be similar. For k=2, 3, the $Xk^{bu}$, $Yk^{bu}$ matrices can be stacked to obtain $Xs^{bu}$, $Ys^{bu}$ arrays of size I×3×2 and N×3×2 respectively, and similarly for k=1, 4. Because the branch and bus ranks are generally independent, the contingencies grouped together in $Xs^{br}$, $Xs^{bu}$ can differ. In the illustration, contingency k=2 is grouped with k=4 for branch perturbations, but k=2 is grouped with k=3 for bus perturbation. In additional examples, contingency mask matrix Hk can also be stacked into one or more 3-D arrays Hs, as shown by arrow 349.

Some or all of the data items 305 shown in FIG. 3A can be outputted (e.g. returned to a calling program, saved in memory or in storage, or transmitted to another computer) for use in evaluating candidate solutions, e.g. in the form of vectors of power injections.

4. Candidate Evaluation

Table 6 illustrates an example of operation L204, and is described below with reference to FIG. 3B. Dotted outline 305 indicates quantities which can be received from the precompute stage L201 (or, in some cases, from input stage L200).

TABLE 6

Evaluation of input vector of power flow injections

| L400 | Obtain q |
|---|---|
| L401 | Compute base case branch currents r0 |
| L402 | Compute contingency branch currents $rk^{br}$ due to branch perturbations |
| L403 | Compute contingency branch currents $rk^{bu}$ due to bus perturbations |
| L404 | Compute $\{i^>\}, \{i^<\}$ |
| L405 | Compute r1 |
| L406 | if all violated contingencies are to be reported for each branch, then |
| L407 | Compute $\{(i, k)^V\}$ |
| L408 | else, if only the maximally violated contingency needed for each branch, |
| L409 | Compute $\{(i, k)^V\}$ |
| L410 | end if |
| L411 | if using simplified sensitivity factors (without bus perturbations) then |
| L412 | Compute D1 |
| L413 | else (with bus perturbations) |
| L414 | Compute D1 |
| L415 | end if |

At operation L400, an input vector q can be received, which can be a vector of power injections over a set of N transactional nodes. At operation L401, base case branch currents can be computed according to Equation E4.1, similarly to the operation indicated by arrow 351 of FIG. 3B.

$$r0 = D0 \cdot q \quad (E4.1)$$

At operations L402, L403 contingency branch currents $rk^{br}$, $rk^{bu}$ due to branch perturbations and bus perturbations, respectively, can be computed according to Equations E4.2, E4.3. In other examples, 3-D equivalents $rs^{br}$, $rs^{bu}$ can be computed using Equations E4.4, E4.5, similar to the operations indicated by arrows 352, 353 of FIG. 3B.

$$rk^{br} = Hk \cdot (Xk^{br} \cdot ((Yk^{br})^T \cdot q)) \quad (E4.2)$$

$$rk^{bu} = Hk \cdot (Xk^{bu} \cdot ((Yk^{bu})^T \cdot q)) \quad (E4.3)$$

$$rs^{br} = Hs \cdot (Xs^{br} \cdot ((Ys^{br})^T \cdot q)) \quad (E4.4)$$

$$rs^{bu} = Hs \cdot (Xs^{bu} \cdot ((Ys^{bu})^T \cdot q)) \quad (E4.5)$$

At operation L404, a determination can be made of which branches potentially have power flows outside the range $[-\bar{r}, \bar{r}]$, using Equations E4.6-E4.11. In alternative examples, 3-D arrays $rs^{br}$, $rs^{bu}$ can be used in place of $rk^{br}$, $rk^{br}$ in Equations E4.6-E4.9, as indicated by arrows 354. Operations similar to Equations E4.10-E4.11 are indicated by arrows 355 in FIG. 3B.

$$r\text{Max}^{br} = \max(rk^{br}) \text{ over } k \quad (E4.6)$$

$$r\text{Min}^{br} = \min(rk^{br}) \text{ over } k \quad (E4.7)$$

$$r\text{Max}^{bu} = \max(rk^{bu}) \text{ over } k \quad (E4.8)$$

$$r\text{Min}^{bu} = \min(rk^{bu}) \text{ over } k \quad (E4.9)$$

$$\{i^>\} = \{i : (r0 + r\text{Max}^{br} + r\text{Max}^{bu})_i > \bar{r}_i\} \quad (E4.10)$$

$$\{i^<\} = \{i : (r0 + r\text{Min}^{br} + r\text{Min}^{bu})_i < -\bar{r}_i\} \quad (E4.11)$$

The remaining branches, satisfying Equation E4.12 can be discarded or ignored in subsequent evaluation. The union of $\{i^>\}$, $\{i^<\}$ is a subset of the I monitored branches, with cardinality $I^{<>}$. Then, at operation L405, the branch contingency power flows (including base case current r0 and the perturbation power flows rk or rs, can be computed by Equation E4.12 for each of these branches, corresponding to arrows 356 in FIG. 3B.

$$r1 = Hk \cdot (r0 + rk^{br} + rk^{bu}) \quad (E4.12)$$

A list of V violations can be computed at operations L406-L410. At L407, the list of violations can be computed according to Equation 4.13 to obtain all branch-contingency pairs violating their respective branch constraint. At L409, only the largest violated contingency for each branch can be retained, e.g. according to Equation E4.14. Equation E4.14 collects contingencies k having maximum value of $(|(r1)_{i,k}| - \bar{r}_i)$ for each i, subject to there being a violation $(|(r1)_{i,k}| - \bar{r}_i) > 0$. Arrows 357 in FIG. 3B represent an operation similar to either operation L407 or L409.

$$\{(i,k)^V\} = \{i,k : |(r1)_{i,k}| > \bar{r}_i\} \quad (E4.13)$$

$$\{(i,k)^V\} \{i,k : \max(|(r1)_{i,k}| - \bar{r}_i) \text{ over } k, \text{ and}(|(r1)_{i,k}| - \bar{r}_i) > 0\} \quad (E4.14)$$

In some examples, the reported violations can be extended to triples by incorporating either $(r1)_{i,k}$ or another measure of the extent of the violation such as $\Delta = (|(r1)_{i,k}| / \bar{r}_{i,i}) - 1$; thus a triple (i, k, r1) or (i, k, $\Delta$), or a 4-tuple (i, k, r1, $\Delta$) can be formed for each of the V violations.

Sensitivities D1 can be computed at operations L411-L415. In some examples, sensitivities can be computed retaining only branch perturbations, at operation L412, according to Equation 4.15, with similar operations indicated by arrows 358. In other examples, both branch and bus perturbations can be included, at operation L414, according to Equation 4.16, with similar operations indicated by arrows 359 in FIG. 3B.

$$D1=D0+(Xk^{br}\cdot(Yk^{br})^T) \quad (E4.15)$$

$$D1=D0+(Xk^{br}\cdot(Yk^{br})^T)+(Xk^{bu}\cdot(Yk^{bu})^T) \quad (E4.16)$$

In some examples, an SFT solver can support both clauses of the "if" conditions at L406, L411, with the if/else selection being made at run time or on the basis of configuration parameters. In other examples, only one clause (e.g. only L407 or only L409) can be supported.

Exemplary output quantities 307 can include violation tuples and sensitivities for violated contingencies. In some examples, data structures D0 and r0 can be included in output 307 as shown.

VI. Second Example SFT Method

Figure 4:
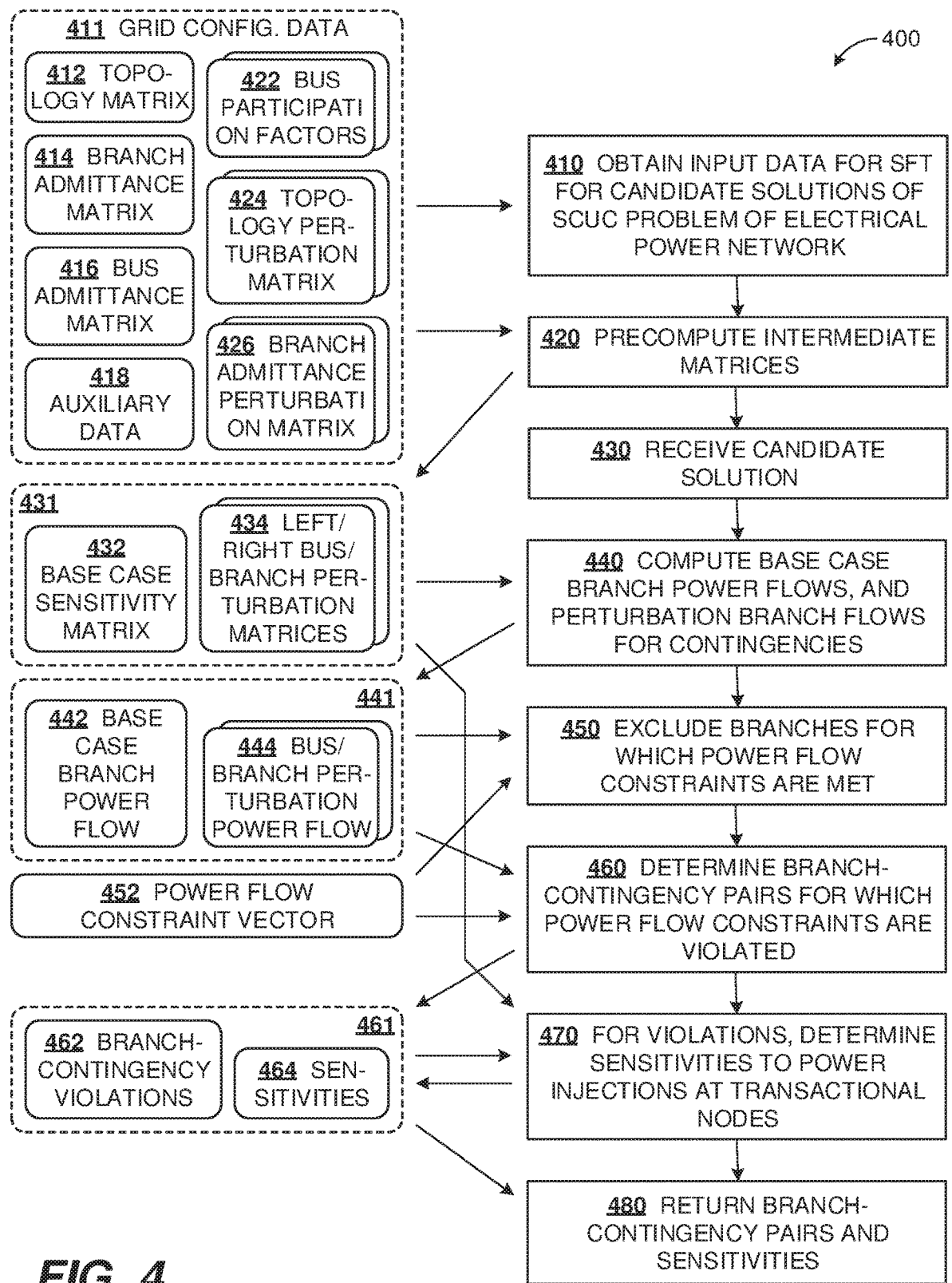
FIG. 4 is a flowchart of a second example SFT method according to the disclosed technologies.

FIG. 4 is a flowchart 400 of a second example SFT method. In this method, a precompute phase precedes evaluation of a candidate solution. Grid configuration data is used to precompute intermediate matrices. A candidate solution to a SCUC problem is provided along with a call from a SCUC solver. After SFT evaluation, results can be outputted. The flowchart is organized as process blocks performed by an SFT solver. These process blocks are depicted along with various input, intermediate, and output data associated with the various operations.

At process block 410, input configuration data 411 ("grid config. data") can be obtained for SFT evaluation for one or more candidate solutions of an SCUC problem of an electrical power grid. The electrical power grid can have J bus nodes, N transactional nodes, and I monitored branches. The SCUC problem can be subject to K contingencies having respective branch and bus ranks $sk^{br}$ and $sk^{bu}$. The input data 411 can include a bus admittance matrix A (416, size J×J), a branch admittance matrix C (414, size I×I), a topology matrix M0 (412, size J×I), a power flow constraint vector (452, length I). For each contingency k, the input data can include bus participation inputs 422 for some bus nodes, a topology perturbation matrix Mk (424, size J×$sk^{br}$), and a branch admittance perturbation matrix Ck (426, size $sk^{br}$×$sk^{br}$). Other auxiliary input data 418 can also be present.

Then, at process block 420, multiple intermediate matrices 431 can be computed. These matrices can include a base case sensitivity matrix D0 (432, size I×N) and, for each contingency, left-hand and right-hand branch perturbation matrices (434, size I×$sk^{br}$, N×$sk^{br}$ respectively), and left-hand and right-hand bus perturbation matrices (434, size I×$sk^{bu}$, N×$sk^{bu}$ respectively). The intermediate matrices 431 can be stored persistently for reuse on multiple SFT invocations during solution of a particular SCUC problem.

Following precompute block 420, the SFT solver can be ready to handle one or more candidate solutions. At block 430, one such candidate solution can be received. This candidate solution can be evaluated at process blocks 440, 450, 460, 470. At block 440, the intermediate matrices 431 are operated on the candidate solution to obtain a base case branch power flow vector (442, length I) and perturbation branch power flows 444 for bus perturbations and branch perturbations of the various contingencies, as vectors (length I). In some examples, the flow vectors 444 can be stacked as a 2-D matrix or a 3-D array as described herein. The outputs of block 440 are collectively indicated in dashed outline 441.

At block 450, the various branches can be tested, using outputs 441 and the power flow constraint vector 452, to ascertain certain branches for which power flow constraints are satisfied for all contingencies. These branches can be excluded from further analysis.

Then, at block 460, the remaining branches can be individually analyzed to determine which branch-contingency pairs have a violation of the respective power flow constraint. These branch-contingency pairs 462 can be V in number. The determination at block 460 can be made by combining outputs 441 with the power flow constraint vector 452.

Additionally, at block 470, sensitivities to power injections at the transactional nodes can be made for each violated branch-contingency pair. These sensitivities can be organized as a matrix D1 (464) of size up to V×N. Matrix D1 464 can have a smaller size in examples where not all sensitivity terms are calculated. In some examples, D1 can always be returned with N columns. In further examples, D1 can be returned with varying number of rows according to whether all V violations are returned, or only a subset (e.g. maximum violation for each branch).

At process block 480, the branch-contingency violation pairs 462 and the sensitivities 464 (shown collectively as dashed outline 461) can be returned to a calling SCUC solver. In some examples, the base case sensitivity matrix 432 or the base case branch power flows 442 can also be returned as part of output 461.

Numerous variations of this method can be implemented. For example, the matrix computations can be organized differently, or different matrix sizes can be used. In some examples, at least one of the input data matrices described above can have the indicated size. In other examples, topology perturbation matrix M1 (424) and branch admittance perturbation matrix C1 (426) can have the sizes indicated. In further examples, base case sensitivity matrix can have the indicated size; branch perturbation matrices can be provided as left and right factors $Xk^{br}$, $Yk^{br}$ having the sizes indicated for one or more contingencies; or the left and right branch perturbation matrices can be stacked into 3-D arrays $Xs^{br}$, $Ys^{br}$ having respective dimensions I×s×$sk^{br}$ and N×s×$sk^{br}$ or a permutation thereof.

VII. First Example SCUC Method

Figure 5:
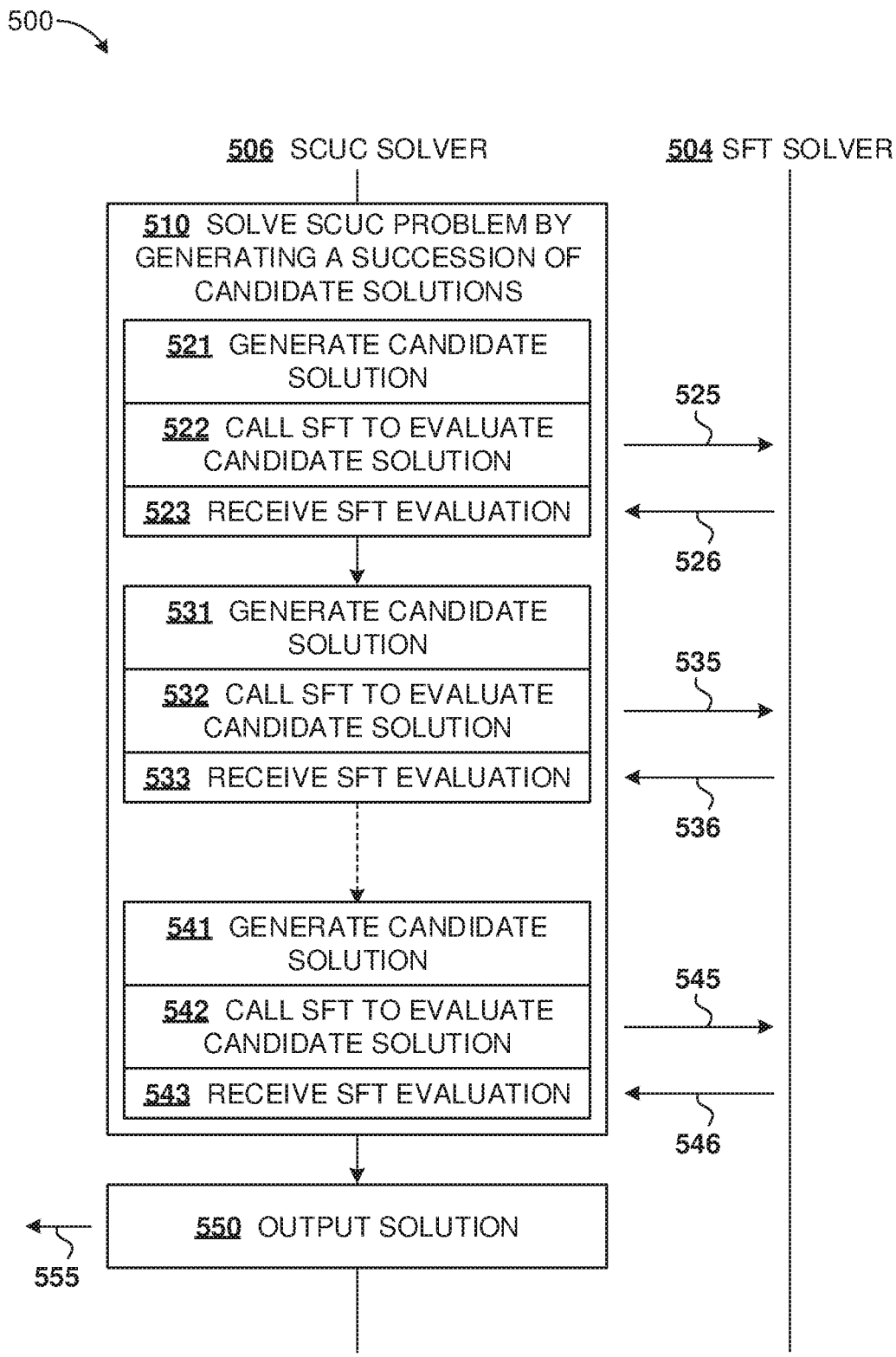
FIG. 5 is a flowchart of a first example SCUC method according to the disclosed technologies.

FIG. 5 is a flowchart 500 of a first example SCUC method. In this method a SCUC solver makes multiple calls to a disclosed SFT solver, to arrive at a validated solution in a single pass over a search space. The process blocks of this method can be performed by SCUC solver 506. For clarity of illustration, SFT solver 504 is also depicted, however SFT solver 504 is not a necessary part of the illustrated method.

At process block 510, a SCUC problem is solved by generating a succession of candidate solutions. Block 510 can represent a single pass of a branch-and-bound search over a high-dimensional space of power grid variables. Within block 510, process blocks 521-523, 531-533, and 541-543 represent groups of operations associated with respective candidate solutions among the succession of candidate solutions.

At process block 521, a first candidate solution can be generated. As described herein, this candidate solution can be generated using a branch-and-bound procedure, however this is not a requirement, and other SCUC solution techniques can also be used. At process block 522, SFT solver 504 can be called for the first candidate solution, as indicated by arrow 525. Correspondingly, at process block 523, results of the SFT evaluation can be received (arrow 526) from SFT solver 504.

The SCUC solver can continue its search procedure. In some examples, one or more violated constraints determined and returned by SFT solver 504 on the first candidate solution can be added to the SCUC problem. In further examples, one or more sensitivities determined and returned by SFT solver 504 can be applied to an instant candidate solution and used to guide the SCUC solution process. For example, with the sensitivities associated with one or more particular violated constraints, the SCUC solver can make corresponding adjustments to power injections at transactional nodes, that would render the associated contingency compliant with those violated constraints.

Different violations can be addressed differently within block 510. A first set of violations can be addressed by adding associated constraints to the SCUC problem, a second set of violations can be addressed by using sensitivities to adjust power injections at transactional nodes, while a third set of violations can remain unaddressed at a particular stage. In some examples, only certain top-ranking violations can be addressed by the SCUC solver 506. These top-ranking violations can be those having greatest percentage violation of their associated constraint, greatest magnitude violation of power flow, or ranking according to another metric. Branches can be given weight according to their criticality within the power grid, and such weights can be incorporated into ranking of violations. For example, a transmission line on a main corridor can have greater weight than a distribution line to a small load. The number of violations addressed at a SCUC stage can be a predetermined number of top-ranking violations, or violations having a score above a predetermined threshold. The number of violations addressed can vary over the course of block 510. For example, during initial stages, only one or a few top-ranking or most-critical violations can be addressed, so as to keep the computation burden of the SCUC procedure within a bound. At later stages, when the SCUC procedure is close to convergence, more violations can be addressed to accelerate the convergence of the SCUC procedure in fewer steps, albeit with greater computational burden at each step.

In this manner, process block 510 can continue until a second candidate solution is generated at block 531. As before, SFT solver 504 can be called at process block 532 for the second candidate solution, as indicated by arrow 535, and results of the SFT evaluation can be received (arrow 536) at process block 533. Violations can be addressed as described above, and process block 510 can proceed in a similar manner, eventually generating a (last) candidate solution at block 541.

At block 542, SFT solver 504 can be called again, as indicated by arrow 545, and one or more results can be received at block 543 (arrow 546). Unlike previous calls, the results from the SFT evaluation can satisfy a termination condition, upon which block 510 can complete, and the solution of block 541 can be outputted at process block 550. Outputting a solution can take various forms. In some examples, the solution can be returned to a supervisory computer program, such as a program performing market clearing for a day-ahead market. In other examples, the solution can be outputted for storage on a hard-disk or other computer-readable media. In further examples, the solution can be output by transmission over a network to another computing system.

In some examples, SCUC solver 506 can make a determination that the SCUC problem is solved. SFT solver 504 can check for violations and can return violations as described herein. In varying examples, violations can be defined differently, or different criteria can be applied for violations to be returned by SFT solver 504. In some examples, violations can be defined for all tuple (i, k, T) for which flow on branch i violates a respective constraint for contingency k (including k=0 for the base case) at period T. In other examples, violations can be defined for tuples (i, T) i.e., the most violated power flow over all contingencies for branch i at period T. In varying examples, the SCUC problem can be determined to be solved when no new violated constraints are reported by the SFT solver 504, or when there are no violated constraints at all (i.e. all security constraints are satisfied). That is, the iterations between SCUC solver 506 and SFT solver 504 can stop upon having no violations returned by SFT solver 504, or upon having no new violations returned from SFT solver 504.

However, process block 510 can terminate according to a variety of termination conditions. As described above, the SFT evaluation received at block 543 can indicate that all constraints are satisfied and that there are no violations of any evaluated contingency. In that case, the solution of block 541 can be deemed to be a satisfactory solution to the solved SCUC problem. In other examples, SCUC solver 506 can execute a two-pronged approach. In one prong, SCUC solver 506 can search for successively improved solutions according to an objective function for the power grid. In another prong, SCUC solver 506 can progressively evaluate a bound for how good a solution is possible. Considering for purpose of illustration that a lower value of the objective function is better, the bound can be a progressively increasing lower bound. If the figure of merit is within a threshold of the bound, then SCUC solver 506 can determine that no significant improvement is possible, the SCUC problem can be deemed solved, and the solution of block 541 can be returned as a best-possible solution, even if not all constraints are satisfied, or if some contingency violations remain. In further examples, SCUC solver 506 can reach a force termination based on e.g. reaching or exceeding a computing time limit.

Numerous variations and extensions of the first SCUC method can be implemented within the scope of the disclosed technologies, including several described herein. For example, calls to SFT solver 504 (e.g. arrows 525, 535, 545) can be made selectively, i.e. other candidates can be generated in block 510 for which SFT is not evaluated. The selective invocation of SFT can be based on amount of improvement from an incumbent solution (e.g. an improvement in the objective function below a threshold can be used as a criterion to skip a further SFT call), can be periodic (e.g. every third candidate solution can have SFT invoked), or can be based on elapsed computer time since the immediately preceding invocation of SFT. The criterion for selective SFT invocation can dynamically evolve over the course of process block 510.

VIII. Second Example SCUC Method

Figure 6:
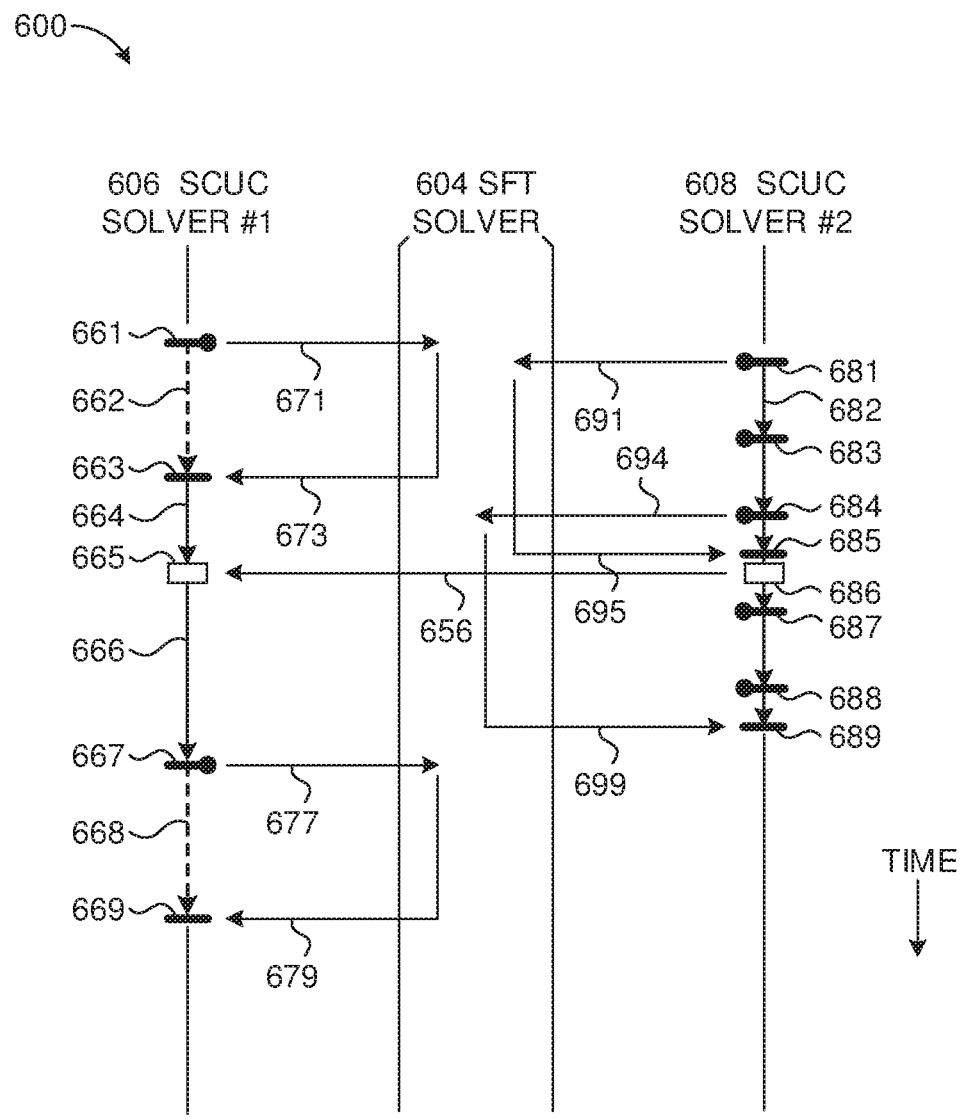
FIG. 6 is an interaction diagram of a second example SCUC method according to the disclosed technologies.

FIG. 6 is an interaction diagram 600 of a second example SCUC method. In this method, two SCUC solvers 606, 608 share an SFT solver 604 which can be implemented as a service. In diagram 600, SFT solver 604 is represented as a vertical band, while SCUC solvers 606, 608 are each represented as single vertical lines. Time progresses downward.

Starting with SCUC solver #1 606, bar 661 indicates determination of a candidate solution, which is transmitted to SFT solver 604 at arrow 671. In time, SFT solver 604 can evaluate the candidate solution 661 and return evaluation results as indicated by arrow 673. The returned results are indicated on the timeline of SCUC solver #1 606 by bar 663.

That is, in diagram 600, bars with bullet ends, like 661, indicate a new candidate solution, while bars with plain ends, like 663, indicate SFT evaluation results for an associated candidate solution. Between bars 661 and 663, dashed arrow 662 indicates that SCUC solver #1 606 can be idle. That is, SCUC solver #1 606 blocks upon SFT call 671, resuming operation when evaluation results are received at 673. Similarly, SCUC solver #1 606 can determine another candidate solution at 667, call for SFT evaluation (arrow 677), and block (arrow 668) until evaluation results are received at bar 669. The SFT solver 604 can duly evaluate the candidate solution and return results (arrow 679).

Concurrently, SCUC solver #2 608 can generate candidate solutions at bars 681, 683, 684, 687, and 688. Unlike SCUC solver #1 606, SCUC solver #2 608 can invoke SFT selectively for candidate solutions 681 and 684, and can omit SFT evaluation for candidate solutions 683, 687, 688. Candidate solutions 681, 684 can be transmitted to SFT solver 604 at arrows 691, 694 respectively, and evaluation results can be returned via arrows 695, 699 at bars 685, 689 respectively.

SCUC solver #2 608 also does not block while waiting for SFT evaluation results, as indicated by solid arrows such as 682. That is, SCUC solver #2 608 can continue searching for improved solutions while waiting for the evaluation results from candidate solution 681. Once these evaluation results are received at bar 685, some among any detected violations can be addressed as described herein, adding constraints or modifying a solution to avoid a contingency violation.

Further, at block 686, SCUC solver #2 608, can prepare a packet and transmit it to SCUC solver #1 606, as indicated by arrow 656 to block 665 on the timeline of SCUC solver #1 606. That is, SCUC solvers 606, 608 can cooperate in the solution of a common SCUC problem. The transmitted packet can be based at least partly on the SFT evaluation results received at bar 685. The transmitted packet can include information related to contingency violations or violations of constraints in a base case, information about the candidate solution 681, information about a lower bound for achievable figure of merit, or other information regarding progress of SCUC solver #2 608 in its search space. Although diagram 600 shows a single communication between SCUC solvers 606, 608, this is not a requirement. In other examples, there can be multiple communications between SCUC solvers 606, 608, or packet transmissions in both directions.

Numerous variations and extensions of this method can be implemented within the scope of the disclosed technologies, including several described herein. For example, SCUC solvers 606, 608 can solve the same SCUC problem, e.g. for a particular hour of a day ahead market on a same power grid. In other examples, SCUC solvers 606, 608 can solve different problems on the same power grid, for example the hours starting at 2 pm and 3 pm respectively. By utilizing staggered starts, the earlier running SCUC solver can aid the later running SCUC solver to converge more quickly on its solution. In further examples, SCUC solvers 606, 608 can cooperatively tackle different portions of a search space for a single SCUC problem. SCUC solvers 606, 608 can utilize different computational techniques, or can utilize a same technique with different strategies or configurations.

IX. Third Example SCUC Method with SCED Integration

Figure 7:
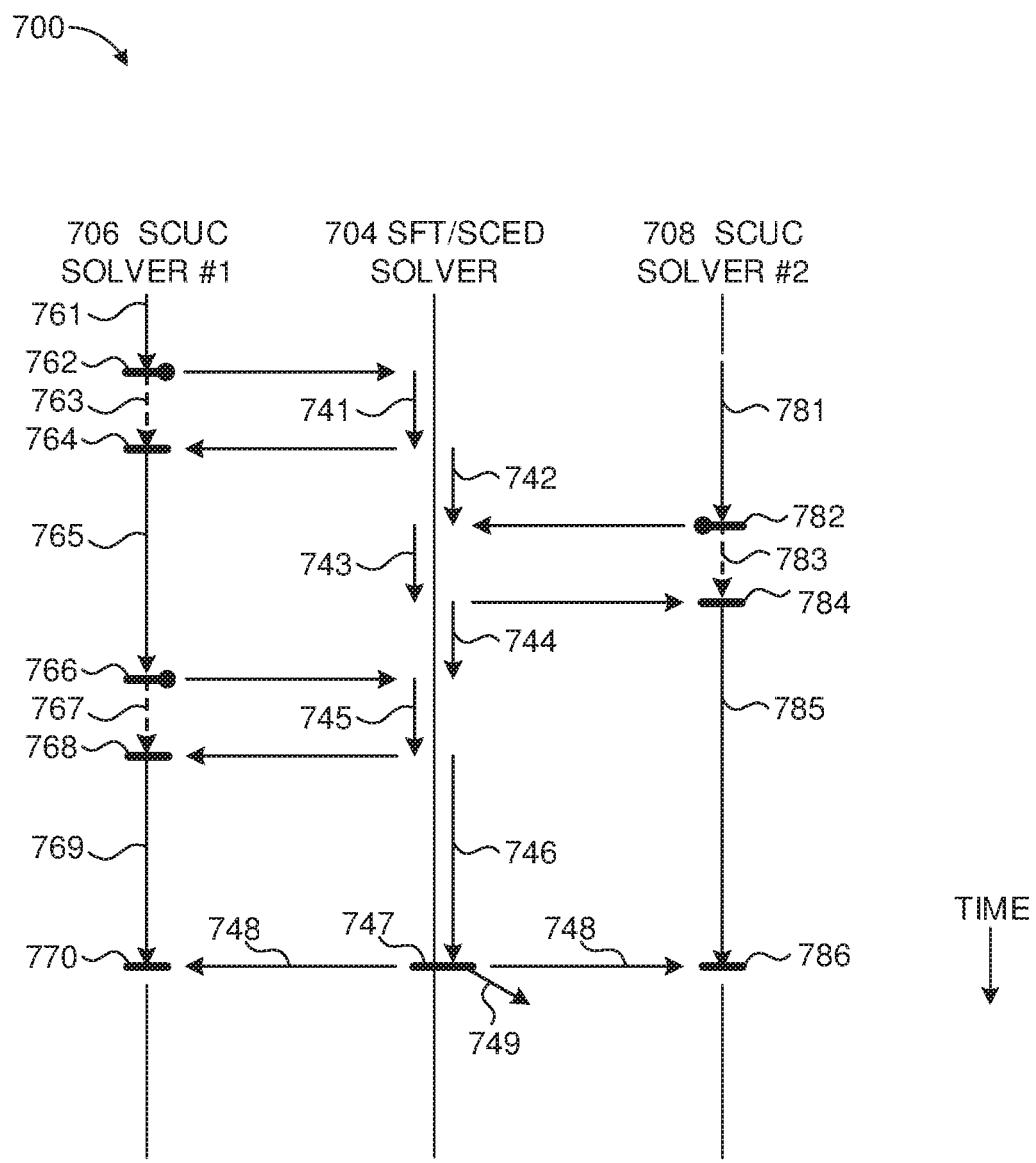
FIG. 7 is an interaction diagram of a third example SCUC method according to the disclosed technologies.

FIG. 7 is an interaction diagram 700 of a third example SCUC method integrated with a parallel Security-Constrained Economic Dispatch (SCED) optimization process. In this method, SCUC solvers 706, 708 evaluate a SCUC problem, while solver 704 alternates between (i) providing SFT as a service to the SCUC solvers 706, 708, and (ii) performing continuous optimization and refinement of a corresponding SCED problem. The SCED solver 704 is tasked with setting dispatch value and prices for participants on a power grid, and can factor in transitions and ramp rates between one market period and the next. The illustrated configuration is exemplary. More or fewer SCUC solvers can be used, or the SFT and SCED processes can run on separate computers.

SCUC solver #1 706 can perform an optimization process using branch-and-bound or another technique at 761, leading to a candidate solution at 762. A request for SFT evaluation for this candidate can be issued, and SCUC solver #1 706 can block (763) until the SFT evaluation is received at 764. The SCUC process can continue (765) and a second candidate solution can be generated at 766, for which SFT evaluation can also be requested. SCUC solver #1 706 can block (767) until the SFT evaluation is received at 768. SCUC solver #1 706 can continue (769) until a termination command 748 is received at 770.

Turning to the SFT/SCED solver 704, the candidate solution from SCUC solver #1 706 at 762 can be evaluated (741), and evaluation results can be returned to solver #1 706. At this point, SFT/SCED solver 704 can pick up the SCED process (742) until another SFT request is received from SCUC solver #2 708 at 782. This candidate can be evaluated at 743, and the result returned to solver #2 708 at 784, at which point, SFT/SCED solver 704 can resume the SCED process (744), until the request to evaluate candidate 762 causes solver 704 to switch back to SFT evaluation. Finally, SFT/SCED solver 704 can continue the SCED process until successful termination at 747. The SCED problem having been solved, further SCUC optimization can be unnecessary, and termination signals 748 can be sent to SCUC solvers 706, 708. The final solution can be outputted at 749.

SCUC solver #2 708 can perform SCUC optimization in parallel with solver #1 706. Solvers 706, 708 can use a same technique with different configuration parameters, or can use different optimization techniques. Solver #2 708 can perform optimization at 781, 785, and can block at 783, waiting for an SFT evaluation on a candidate solution generated at 782, until the SFT evaluation is received from SFT/SCED solver 704 at 784. Like solver #1 706, solver #2 708 can terminate at 786 in response to termination signal 748.

Through the interactions described, the SCED optimization of solver 704 can receive successive candidate solution inputs and security constraints from SCUC solvers 706, 708, which allows the SCED optimizer 704 to continuously refine and optimize the SCED problem. Operating in conjunction with SCUC and SFT processes, a certified feasible and refined SCED solution can be delivered at 749. Additionally, the illustrated configuration allows a single SFT solver to concurrently support multiple SCUC processes, which is an additional saving in computing resources, compared to having individual SFT processors for each of multiple SCUC solvers. Further, in some examples, SFT solver 704 can maintain a queue of candidate solutions awaiting evaluation.

Numerous variations can be implemented. In one example, a SCED solver can incorporate constraints based on violations determined by the SFT evaluation. The SCED solver can use these constraints to solve the SCED problem with continuous refinement, and can output a certified feasible, refined solution. In further examples, this solution can be provided as input to a concurrent optimizer, along with solutions from one or more SCUC solvers.

X. Examples of Innovative Features

In this section, some innovative features are summarized, first for speeding up SFT, then for integrating SFT with SCUC.

1. SFT Formulated Based on Power Injection at Transactional Nodes.

Input vector q can be received as a vector of length N rather than J, and accordingly right-hand factors $Yk^{br}$, $Yk^{bu}$ for perturbation power flows can also have size N×sk rather than J×sk. For typical power grids, this can provide a direct reduction in matrix size by about a factor of 10, as compared with conventional technology. The smaller data structures also result in faster multiplication at operations L401-L403.

2. Sensitivities Computed Directly with Respect to Power Injection at Transactional Nodes.

The evaluation of contingency sensitivities D1 at operations L412, L414 can be performed directly for transactional nodes, rather than computing sensitivities for various bus nodes and subsequently transforming from bus nodes to the transactional nodes of interest. This provides savings through precomputation of the right and left branch perturbation current factors Xk, Yk enabling efficient calculation of components of matrix D1. Further savings are provided by operating on matrices of size N rather than size J.

3. Intermediate Matrices Precomputed.

Operations with large matrices (e.g. A, E, C0, M0, Z) can be absorbed into precomputation as at operation L201, so as not to be required repeatedly at each candidate evaluation L204. This can include Cholesky factorization of bus admittance matrix A. Relative to a host SCUC problem, the precomputation can be performed in parallel with SCUC model generation and initial computations, thereby avoiding a burden on even the first SFT call. The consolidation of precompute operations also results in avoidance of bus phase angle calculations during the candidate evaluation L204.

3A. Intermediate Matrices Precomputed for Branch Power Flows.

A significant portion of SFT computation can be in computation of contingency branch power flows as at operations L402-L405. By providing intermediate matrices Xk, Yk (superscripts br, bu omitted for simplicity), the bulk of computation operations (e.g. operations L306-L314) can be removed from the candidate evaluation of operation L204, and can be performed just once for the SCUC problem at operation L201. The resulting advantage allows SFT to be called many more times within a given time budget, which in turn multiplies the savings due to precomputation.

4. Matrix Multiplications Organized to Use Smaller Matrices, Reducing Storage or Computation.

Intermediate matrices can be organized to use smaller matrices than conventional approaches. In some examples, two smaller matrices can be advantageously used instead of one larger matrix. For example, left and right factors Xk, Yk (superscripts br, bu omitted for simplicity) have sizes of I×sk, N×sk respectively. To illustrate, with I=20,000, N=2,000, and sk=10, Xk and Yk together can have 220,000 data fields. In comparison, $Xk \cdot Yk^T$ would have 40 million data fields. The reduction in storage required is a factor of 200. Furthermore, the calculation $Xk \cdot (Yk^T \cdot q)$ can be performed in two matrix multiplications, the first is of size (sk×N)·(N×1) and requires N·sk operations, while the second is of size (I×sk)·(sk×1) and requires I·sk operations. In the illustration above, the total number of operations is about 220,000. In comparison, a conventional evaluation $(Xk \cdot Yk^T) \cdot q$, with the parenthetical term being a precomputed 20,000×2,000 matrix, results in a single matrix multiplication of size (I×N)·(N×1), requiring I·N operations, which is about 40 million operations in the present illustration. Thus, the reduction in computation is about a factor of 180. That is, computation at operations L402, L403 can be reduced by about 99.5%.

Computation improvements of a similar nature can be obtained during precomputation as well. For a similar illustration as above, the computation savings of computing $F^{-T} \cdot (F^{-1} \cdot Mk)$ at operation L306 can be about 99.9% (computation reduction by a factor of 1000) compared with computing $(A^{-1} \cdot Mk)$ in a conventional approach.

5. Contingencies Grouped According to Bus or Branch Rank.

In some examples, the left and right factors Xk, Yk can be stacked into 3-D arrays as described in context of arrows 348 of FIG. 3B. To illustrate, with K=1000 and 10 different values of sk, instead of evaluating perturbation power flows separately for each of 1000 contingencies, the arrays Xs, Ys allow bulk evaluation with 10 sets of 3-D arrays. Although the number of individual operations required for array multiplications can be about the same in either case, as a practical matter the use of 3-D arrays can be significantly faster through the use of optimized libraries for array computation.

6. Branches without Contingency Violations Identified and Pruned.

As discussed in context of arrows 348 of FIG. 3B, contingencies can be aligned differently within the stacks $Xs^{br}$ and $Xs^{bu}$. Accordingly, realigning the contingencies for efficient computation of branch flow currents r1 can involve computationally intensive permutations of slices of an rs array. However, in typical cases, there is significant margin between the base case branch flows r0 and the power flow constraint $\bar{r}$ for most branches i. Therefore, as described in context of operation L404, the minimum and maximum values of branch perturbation current can be computed across all contingencies for a given branch i, without requiring any matrix permutation or slice extraction. In this way, the $I^{OK}$ branches, which are free of any contingency violations, can be separated from a relatively small number of $I^{<>}$ branches which could have contingency violations, without actually computing r1 for any branch or contingency. Then, the relatively compute-intensive operations of re-ordering and summing the components of r1, as at operation L405, can be limited to just the remaining $I^{<>}$ branches.

7. Calls to SFT Embedded Within One Pass of an SCUC Procedure.

Fast SFT can be embedded within a single pass of a SCUC procedure such as a branch-and-bound search. Because incorporation of constraints can significantly slow down internal steps of a branch-and-bound search, fast SFT allows the search to initially be performed efficiently with very few constraints, and additional constraints gradually added subsequently, as needed, based on SFT results. In one view, incorporation of constraints that are not going to be violated into SCUC leads to a waste of computation resources. The embedded SFT calls allow only necessary constraints to be incorporated, leading overall to significant speed-up in the SCUC solution process. Still further, better quality SCUC solutions can be obtained in a single pass, compared to multiple slow passes in conventional approaches.

Because the SFT is very fast, multiple SFT calls from SCUC do not incur a large runtime burden. Whereas, by allowing the SCUC procedure to complete in a single pass, a large saving in total computation can be realized.

8. Calls to SFT Integrated with a Continuous Optimization SCUC Solver.

SFT can be integrated with parallel SCUC and SCED solvers as described in context of FIG. 7, to efficiently produce a certified, refined solution to a SCED problem. Because SCED can be solved as a linear programming problem, which can be faster than a SCUC solution using MIP or branch-and-bound, the SCED+SFT approach can provide additional reduction in required computation.

XI. Example Interfaces with an Electrical Power Grid

In some examples, the methods and apparatus described in this disclosure can be integrated with equipment of an electrical power grid. For example, grid configuration data utilized by a disclosed SFT or SCUC solver can be obtained based on inputs from sensors of the electrical power grid. Software instructions of disclosed embodiments can cause a hardware processor to receive sensor data indicating outage or status of one or more components of the electrical power grid. The received sensor data can be incorporated into configuration data (e.g. topology matrix M0, admittance matrix A, or admittance matrix C0) associated with the electrical power grid. The configuration data can be stored in a configuration data store. The SFT or the SCUC problem can be configured based at least partly on the stored configuration data. Operations of an SFT solver, such as pre-computation, can be based at least partly on the stored configuration data.

As another example, outputs from an SFT or SCUC solver can be used to control actuators within the electrical power grid, to achieve operation according to grid configuration solutions obtained by the SCUC and SFT solvers, or to alleviate constraints at risk of violation. Based on an SFT evaluation or a SCUC solution, a processor associated with disclosed embodiments can send a signal that causes the power grid to control a magnitude power injection at a load or generator coupled to the electrical power grid during a future time period associated with the SCUC problem or the SFT evaluation. The signal can be based on a list of violations determined by SFT, and can operate an actuator of the electrical power grid so as to alleviate or avoid one or more of the contingency violations. For example, a transmission line carrying power from a generator can be within constraints for the base case, but could be at 110% of its constraint in a particular contingency. By reducing the injected power from the generator by at least 10% of the constraint value, safe operation can be achieved both in the base case and in the particular contingency.

XII. A Generalized Computing Environment

Figure 8:
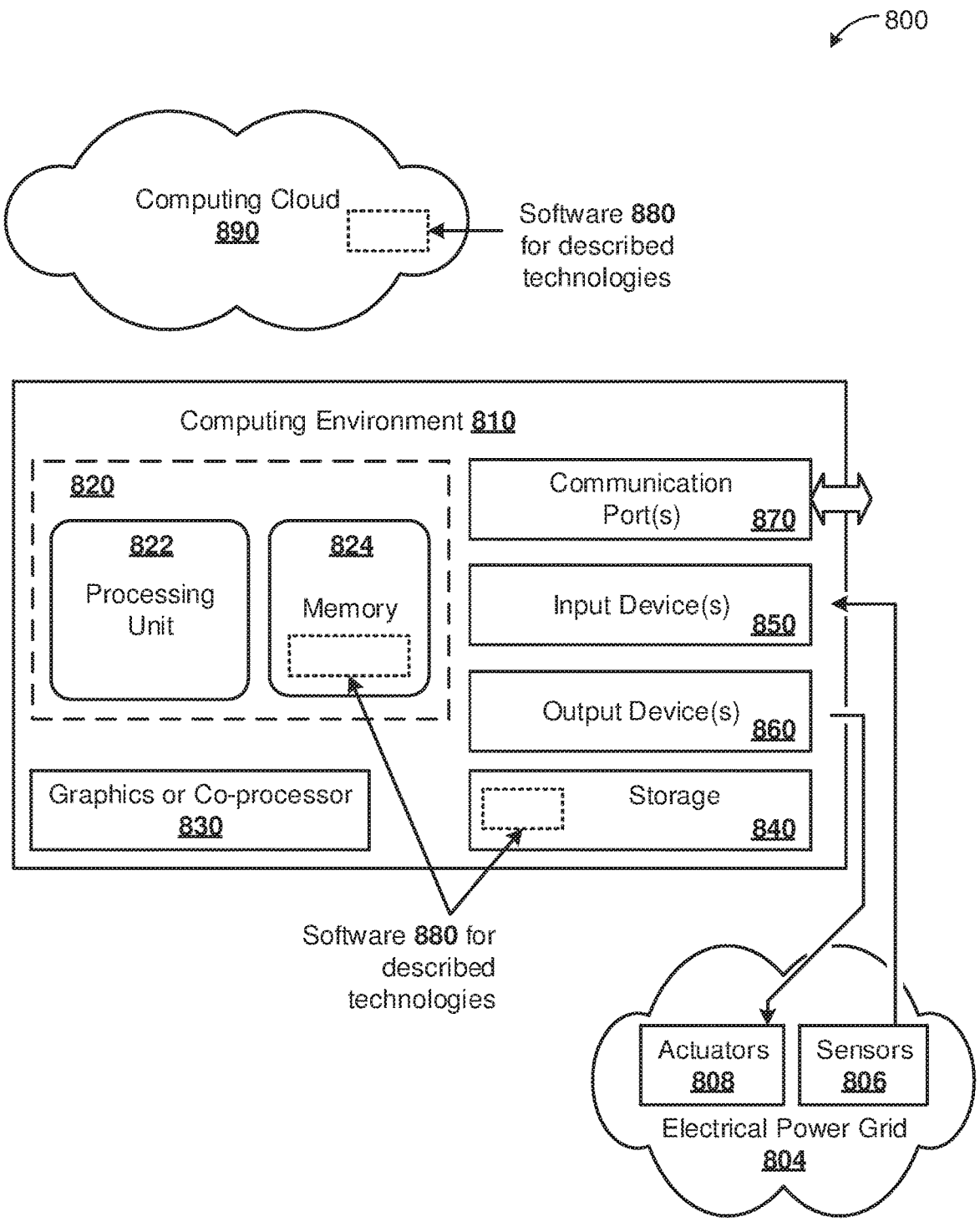
FIG. 8 illustrates a generalized example of a suitable computing environment in which described embodiments, techniques, and technologies can be implemented.

FIG. 8 illustrates a generalized example of a suitable computing system 800 in which described examples, techniques, and technologies for SFT and applications for electrical power grids can be implemented. The computing system 800 is not intended to suggest any limitation as to scope of use or functionality of the present disclosure, as the innovations can be implemented in diverse general-purpose or special-purpose computing systems. The computing system 800 can evaluate SFT on candidate inputs, solve SCUC or SCED problems, communicate with SCUC or SCED solvers, communicate with other power grid components; or can acquire, process, output, or store data associated with SCUC, SFT, or planning or management for one or more electrical power grids as described herein.

With reference to FIG. 8, computing environment 810 includes one or more processing units 822 and memory 824. In FIG. 8, this basic configuration 820 is included within a dashed line. Processing unit 822 can execute computer-executable instructions, such as for control or data acquisition as described herein. Processing unit 822 can be a general-purpose central processing unit (CPU), a processor in an application-specific integrated circuit (ASIC), or any other type of processor. In a multi-processing system, multiple processing units execute computer-executable instructions to increase processing power. Computing environment 810 can also include a graphics processing unit or co-processing unit 830. Tangible memory 824 can be volatile memory (e.g., registers, cache, or RAM), non-volatile memory (e.g., ROM, EEPROM, or flash memory), or some combination thereof, accessible by processing units 822, 830. The memory 824 stores software 880 implementing one or more innovations described herein, in the form of computer-executable instructions suitable for execution by the processing unit(s) 822, 830. The memory 824 can also store configuration parameters, working data structures, intermediate data structures, output data structures, inter-process communication channel parameters, or database data. The memory 824 can also store configuration and operational data.

A computing system 810 can have additional features, such as one or more of storage 840, input devices 850, output devices 860, or communication ports 870. An interconnection mechanism (not shown) such as a bus, controller, or network interconnects the components of the computing environment 810. Typically, operating system software (not shown) provides an operating environment for other software executing in the computing environment 810, and coordinates activities of the components of the computing environment 810.

The tangible storage 840 can be removable or non-removable, and includes magnetic disks, magnetic tapes or cassettes, CD-ROMs, DVDs, or any other medium which can be used to store information in a non-transitory way and which can be accessed within the computing environment 810. The storage 840 stores instructions of the software 880 (including instructions and/or data) implementing one or more innovations described herein. Storage 840 can also store configuration data, data structures, or other databases.

The input device(s) 850 can be a mechanical, touch-sensing, or proximity-sensing input device such as a keyboard, mouse, pen, touchscreen, or trackball, a voice input device, a scanning device, or another device that provides input to the computing environment 810. In some examples, one or more of the input device(s) 850 can be coupled to sensors 806 of the electrical power grid 804. The input devices 850 can acquire state information (e.g. complete or partial outages, projected time for restoration, and so forth) for one or more components of the power grid (e.g. power lines, substation components, or switchgear) or for one or more external systems (e.g. loads, generators, or other interconnected power grids) coupled to the electrical power grid 804. The output device(s) 860 can be a display, printer, speaker, optical disk writer, or another device that provides output from the computing environment 810. Input or output can also be communicated to/from a remote device over a network connection, via communication port(s) 870. In some examples, one or more of the output device(s) 860 can be coupled to actuators 808 of the electrical power grid 804. The output devices can control one or more components of the electrical power grid 804, e.g. to enable or disable such components, or to control power injection to or from loads or generators coupled to the electrical power grid 804.

The communication port(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 800 can also include a computing cloud 890 in which instructions implementing all or a portion of the disclosed technology are executed. Any combination of memory 824, storage 840, and computing cloud 890 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular data types. The functionality of the program modules can be combined or split between program modules as desired in various embodiments. Computer-executable instructions for program modules can be executed within a local or distributed computing system.

The terms "computing system," "computing environment," and "computing device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware, and thus include both software associated with virtualization and underlying hardware.

XIII. Example Cloud Computing Environment

Figure 9:
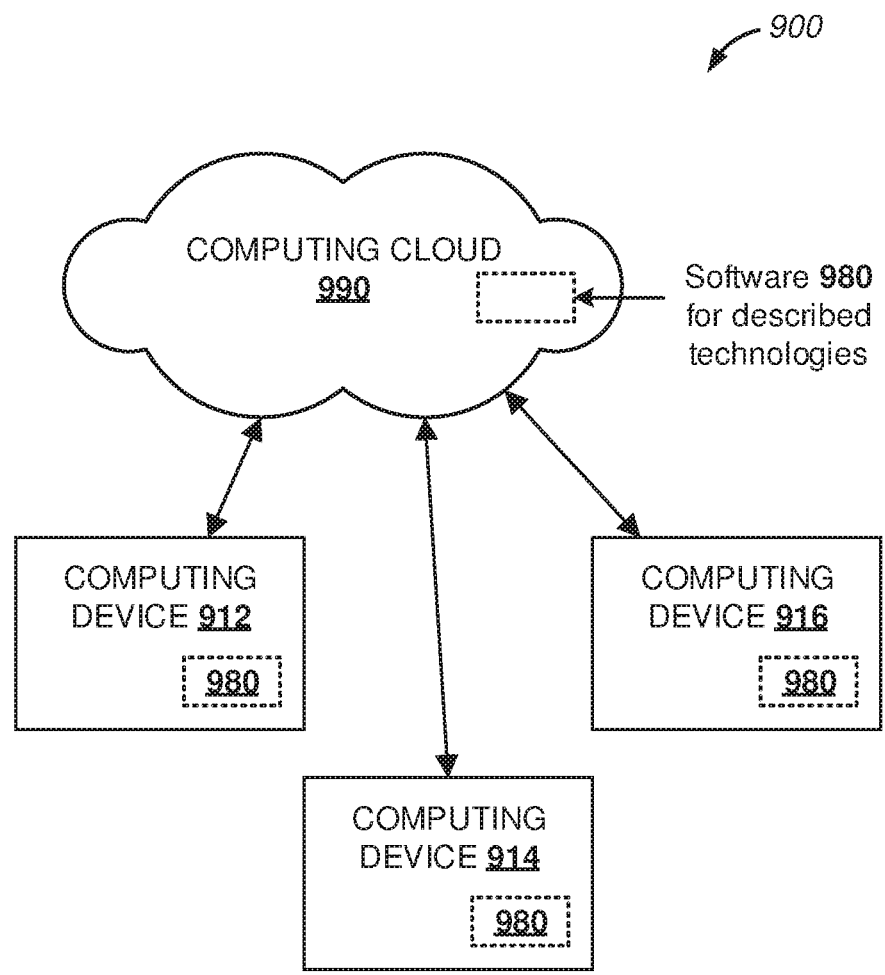
FIG. 9 is a diagram schematically depicting computing devices operating in conjunction with a computing cloud for implementation of disclosed technologies.

FIG. 9 depicts an example cloud computing environment 900 in which the described technologies can be implemented. The cloud computing environment 900 comprises a computing cloud 990 containing resources and providing services. The computing cloud 990 can comprise various types of cloud computing resources, such as computer servers, data storage repositories, networking resources, and so forth. The computing cloud 990 can be centrally located (e.g., provided by a data center of a business or organization) or distributed (e.g., provided by various computing resources located at different locations, such as different data centers and/or located in different cities or countries).

The computing cloud 990 can be operatively connected to various types of computing devices (e.g., client computing devices), such as computing devices 912, 914, and 916, and can provide a range of computing services thereto. One or more of computing devices 912, 914, and 916 can be computers (e.g., server, virtual machine, embedded systems, desktop, or laptop computers), mobile devices (e.g., tablet computers, smartphones, or wearable appliances), or other types of computing devices. Connections between computing cloud 990 and computing devices 912, 914, and 916 can be over wired, wireless, or optical links, or any combination thereof, and can be short-lived or long-lasting. These connections can be stationary or can move over time, being implemented over varying paths and having varying attachment points at each end. Computing devices 912, 914, and 916 can also be connected to each other.

Computing devices 912, 914, and 916 can utilize the computing cloud 990 to obtain computing services and perform computing operations (e.g., data processing, data storage, and the like). Particularly, software 980 for performing the described innovative technologies can be resident or executed in the computing cloud 990, in computing devices 912, 914, and 916, or in a distributed combination of cloud and computing devices.

XIV. General Considerations

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the terms "or" or "and/or" mean any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "access," "block," "call," "compute," "decompose," "determine," "evaluate," "factorize," "generate," "issue," "multiply," "optimize," "output," "perform," "precompute," "produce," "receive," "return," "satisfy," "search," "send," "solve," "stack," "store," "terminate," "transmit," "update," or "violate," to describe the disclosed methods. These terms are high-level descriptions of the actual operations that are performed, or determinations that are made, by one or more computers. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer), on a distributed computer (e.g. in a high-performance computing (HPC) environment), or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ASP.net, B #, C, C++, C #, Curl, Dart, Erlang, Fortran, Go, Java, JavaScript, Julia, Lisp, Matlab, Octave, Perl, PHP, Python, R, Ruby, Rust, SAS, SPSS, WebAssembly, any derivatives thereof, or any other suitable programming language, or, in some examples, markup languages such as HTML or XML, or in any combination of suitable languages, libraries, or packages. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented by an integrated circuit (e.g., an application specific integrated circuit ("ASIC") or programmable logic device ("PLD"), such as a field programmable gate array ("FPGA")). The integrated circuit or specialized computing hardware can be embedded in or directly coupled to a power grid market coordination server or another computing device.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims.

We claim:

1. One or more non-transitory computer-readable media storing instructions that cause one or more hardware processors to perform a method of feasibility testing on a candidate solution for an electrical power grid, the instructions comprising:
   first instructions that, when executed, cause precomputation of a plurality of matrices including a base case sensitivity matrix and two or more contingency matrices, wherein a maximum size of the matrices is at most a first number of monitored branches (I) times a second number of transactional nodes (N);
   wherein the contingency matrices include, for branch perturbations of each contingency of a plurality of contingencies, at least a left branch perturbation matrix and a right branch perturbation matrix;
   second instructions causing evaluation of the candidate solution using the plurality of matrices, wherein the evaluation of the candidate solution pertains to a future time period; and
   third instructions outputting a list of one or more violations of respective contingencies for the candidate solution; and
   fourth instructions that, when executed, cause the one or more hardware processors to send a signal, based on the list of one or more violations, that causes the electrical power grid to control a magnitude of power injection at a load or a generator coupled to the electrical power grid during the future time period.

2. The one or more non-transitory computer-readable media of claim 1, wherein the candidate solution is a vector of power injections at the transactional nodes.

3. The one or more non-transitory computer-readable media of claim 1, wherein the contingency matrices include, for a given contingency of the contingencies, a pair of factor matrices having a common dimension equal to a rank of the given contingency, and having a product representing a contingency sensitivity matrix for the given contingency, wherein a size of the product is at most I×N.

4. The one or more non-transitory computer-readable media of claim 1, wherein the third instructions, when executed, further cause sensitivities to be outputted, each of the sensitivities being a sensitivity of a corresponding power flow of a monitored branch to a change in power injection at a respective one of the transactional nodes.

5. The one or more non-transitory computer-readable media of claim 1, wherein a third number of buses is denoted as J, and all calculations involving matrices of size I×J or size J×J are included in the first instructions.

6. The one or more non-transitory computer-readable media of claim 1, wherein the first instructions, when executed, cause Cholesky decomposition of a bus admittance matrix to be performed.

7. The one or more non-transitory computer-readable media of claim 1, wherein two or more of the contingencies have a given branch rank of at least two;
  wherein the first instructions, when executed, cause a three-dimensional array to be formed by stacking the left branch perturbation matrix of each contingency of the two or more contingencies; and
  wherein the second instructions, when executed, cause perturbation power flow terms to be computed for the two or more contingencies using the three-dimensional array.

8. The one or more non-transitory computer-readable media of claim 7, wherein the second instructions, when executed, cause a subset of the monitored branches to be extracted, wherein a complement of the subset has no contribution to any contingency violation.

9. The one or more non-transitory computer-readable media of claim 8, wherein the second instructions, when executed, cause a plurality of branch and contingency violation pairs to be determined, from the perturbation power flow terms for the subset of monitored branches, for which a respective predetermined branch flow constraint is violated; and each of the branch and contingency violation pairs is included in the list of one or more violations.

10. The one or more non-transitory computer-readable media of claim 1, wherein the contingency matrices further include, for bus perturbations of each contingency of the plurality of contingencies, at least a left bus perturbation matrix and a right bus perturbation matrix.

11. The one or more non-transitory computer-readable media of claim 1, further comprise fourth instructions that, when executed, cause the one or more hardware processors to:
  incorporate constraints based on the list of one or more violations into a security-constrained economic dispatch (SCED) problem;
  solve the SCED problem by continuous refinement; and
  output a certified feasible, refined solution to the SCED problem.

12. The one or more non-transitory computer-readable media of claim 1, further comprising fourth instructions that, when executed, cause the one or more hardware processors to:
  receive data from sensors of the electrical power grid indicating outage or status of one or more components of the electrical power grid;
  incorporate the received data into configuration data associated with the electrical power grid; and
  store the configuration data;
  wherein the precomputation of the plurality of matrices is based at least partly on the stored configuration data.

13. The one or more non-transitory computer-readable media of claim 1, wherein:
  the precomputed plurality of intermediate matrices further comprise a base case sensitivity matrix of size I×N;
  the contingencies have respective branch rank ($sk^{br}$) and respective bus rank ($sk^{bu}$);
  for each contingency of the contingencies, the left branch perturbation matrix has size I×$sk^{br}$ and the right branch perturbation matrix has size N×$sk^{br}$; and
  the contingency matrices further comprise, for each contingency of the contingencies, a left bus perturbation matrix of size I×$sk^{bu}$ and a right perturbation matrix of size N×$sk^{bu}$.

14. A method comprising:
  obtaining input data for a simultaneous feasibility test (SFT) for one or more candidate solutions of a security constrained unit commitment (SCUC) problem, for a future time period, of an electrical power grid;
  wherein the electrical power grid is characterized by a number of bus nodes (J), a number of transactional nodes (N), and a number of monitored branches (I), and wherein the SCUC problem is subject to a number of contingencies;
  precomputing a plurality of intermediate matrices;
  receiving a given candidate solution of the candidate solutions as a vector of length N;
  responsive to the receiving:
    computing a base case branch power flow as a vector of length I;
    computing, for each of the contingencies, perturbation branch flows for perturbed ones of the bus nodes and branches as one or more vectors of length I;
    determining first branches of the I monitored branches for which power flow constraints defined by a power flow limit vector are satisfied for all of the contingencies;
    combining, for each of the contingencies and second branches of the I monitored branches excluding the first branches, the base case branch power flow and the perturbation branch flows, to determine branch-contingency pairs for which respective components of the power flow limit vector are exceeded, wherein a number of the branch-contingency pairs is V;
    determining, for the branch-contingency pairs, sensitivities to power injections at the transactional nodes as a matrix of size V×N; and
    returning the branch-contingency pairs and the sensitivities as results of the SFT for the given candidate solution; and
  based on the results of the SFT, causing a signal to be sent that causes the electrical power grid to control a magnitude of power injection, during the future time period, at a load or a generator coupled to the electrical power grid.

15. The method of claim 14, wherein the electrical power grid is further characterized by a number of bus nodes (J), wherein the contingencies have respective branch rank ($sk^{br}$) and respective bus rank ($sk^{bu}$);
  wherein the input data comprises at least one of:
    a bus admittance matrix of size J×J;
    a branch admittance matrix of size I×I;
    a topology matrix of size J×I;
    a power flow limit vector of size I;
    or, for each contingency of the contingencies:
      bus participation inputs for one or more respective nodes of the bus nodes;
      a topology perturbation matrix of size J×$sk^{br}$; or a branch admittance perturbation matrix of size $sk^{br} \times sk^{br}$; and wherein the precomputed plurality of intermediate matrices comprises at least one of:
a base case sensitivity matrix of size I×N; or
for each contingency of the contingencies:
a left-hand branch perturbation matrix of size $I \times sk^{br}$;
a right-hand branch perturbation matrix of size $N \times sk^{br}$;
a left-hand bus perturbation matrix of size $I \times sk^{bu}$; or
a right-hand bus perturbation matrix of size $N \times sk^{bu}$.

16. A system comprising:
one or more hardware processors with memory coupled thereto; and
non-transitory computer-readable media storing instructions which, when executed by the one or more hardware processors, cause the system to perform operations comprising:
precomputing a plurality of matrices including a base case sensitivity matrix and two or more contingency matrices, wherein:
a maximum size of the matrices is at most a first number of monitored branches (I) times a second number of transactional nodes (N); and
the contingency matrices include, for branch perturbations of each contingency of a plurality of contingencies, at least a left branch perturbation matrix and a right branch perturbation matrix;
evaluating the candidate solution using the plurality of matrices, wherein the evaluation of the candidate solution pertains to a future time period; and
outputting a list of one or more violations of respective contingencies for the candidate solution; and
sending a signal, based on the list of one or more violations, that causes the electrical power grid to control a magnitude of power injection at a load or a generator coupled to the electrical power grid during the future time period.

17. The system of claim 16, wherein the candidate solution is a vector of power injections at the transactional nodes.

18. The system of claim 16, wherein the contingency matrices include, for a given contingency of the contingencies, a pair of factor matrices having a common dimension equal to a rank of the given contingency, and having a product representing a contingency sensitivity matrix for the given contingency, wherein a size of the product is at most I×N.

19. The system of claim 16, wherein the operations further comprise:
outputting sensitivities, each of the sensitivities being a sensitivity of a corresponding power flow of a monitored branch to a change in power injection at a respective one of the transactional nodes.

20. The system of claim 16, wherein a third number of buses is denoted as J, and all calculations involving matrices of size I×J or size J×J are included in the precomputing.

21. The system of claim 16, wherein the precomputing comprises Cholesky decomposition of a bus admittance matrix.

22. The system of claim 16, wherein:
two or more of the contingencies have a given branch rank of at least two;
the precomputing comprises forming a three-dimensional array by stacking the left branch perturbation matrices of the two or more contingencies; and
the evaluating comprises computing perturbation power flow terms for the two or more contingencies using the three-dimensional array.

23. The system of claim 16, wherein the evaluating comprises:
extracting a subset of the monitored branches, wherein a complement of the subset has no contribution to any contingency violation.

24. The system of claim 16, wherein the evaluating comprises determining, from the perturbation power flow terms for the subset of monitored branches, a plurality of branch and contingency violation pairs for which a respective predetermined branch flow constraint is violated; and
wherein the list of one or more violations includes the branch and contingency violation pairs.

25. The system of claim 16, wherein the contingency matrices further include, for bus perturbations of each contingency of the plurality of contingencies, at least a left bus perturbation matrix and a right bus perturbation matrix.

26. The system of claim 16, wherein the operations further comprise:
incorporating constraints, based on the list of one or more violations, into a security-constrained economic dispatch (SCED) problem;
solving the SCED problem by continuous refinement; and
outputting a certified feasible, refined solution to the SCED problem.

27. The system of claim 16, wherein the operations further comprise:
receiving data from sensors of the electrical power grid indicating outage or status of one or more components of the electrical power grid;
incorporating the received data into configuration data associated with the electrical power grid; and
storing the configuration data;
wherein the precomputation is based at least partly on the stored configuration data.

* * * * *